United States Patent
Furukawa

(10) Patent No.: US 7,312,900 B2
(45) Date of Patent: Dec. 25, 2007

(54) METHOD OF DESCREENING SCREENED IMAGE, METHOD OF SEPARATING SCREENED IMAGE INTO REGIONS, IMAGE PROCESSING DEVICE, AND PROGRAM

(75) Inventor: Itaru Furukawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 866 days.

(21) Appl. No.: 10/715,437

(22) Filed: Nov. 19, 2003

(65) Prior Publication Data

US 2004/0114187 A1 Jun. 17, 2004

(30) Foreign Application Priority Data

| Dec. 17, 2002 | (JP) | ............................ P2002-365054 |
| Dec. 25, 2002 | (JP) | ............................ P2002-374349 |
| Jan. 29, 2003 | (JP) | ............................ P2003-020216 |

(51) Int. Cl.
H04N 1/40 (2006.01)
G06K 9/46 (2006.01)
G06T 5/00 (2006.01)

(52) U.S. Cl. .................... 358/3.08; 385/3.2; 385/3.21; 382/192; 382/199

(58) Field of Classification Search ................ 358/1.9, 358/2.1, 3.06–3.08, 3.2, 3.21, 534, 536; 382/254, 382/274, 192, 199
See application file for complete search history.

(56) References Cited

U.S. PATENT DOCUMENTS 4,841,377 A * 6/1989 Hiratsuka et al. ........... 358/3.08
6,026,184 A * 2/2000 Fukushima ................. 382/199

FOREIGN PATENT DOCUMENTS

| JP | 01-302475 | 12/1989 |
| JP | P2000-224415 | 8/2000 |
| JP | P2000-236441 | 8/2000 |
| JP | P2001-86328 | 3/2001 |
| JP | P2002-252756 | 9/2002 |

* cited by examiner

*Primary Examiner*—Scott A. Rogers
(74) *Attorney, Agent, or Firm*—McDermott Will & Emery LLP

(57) ABSTRACT

A method of performing a descreening process with high accuracy by separating a first region from which a gradation area is to be derived and a second region from which a monotone area is to be derived from each other in a screened image with high accuracy is provided. Halftone dot positions and halftone cells are specified at an output resolution level based on the angle dependence of a distribution obtained by counting recorder grids constituting each halftone dot in one direction. By extracting edges of halftone dots and counting them in one direction, the position of deformed halftone dots positioned on a boundary between first regions having different gradation levels is detected at the output resolution level, whereby the position of picture-originated pixels is specified with high accuracy. Based on a positional relationship between inconsistent recorder grids caused when bringing the picture-originated pixels and SPM data into correspondence with each other which is derived from the result of the specification of the position of the picture-originated pixels, a preset separation mask is corrected with high accuracy at a recorder grid level. The use of the separation mask achieves high-accuracy separation between the first and second regions. Consequently, more precise correspondence between the picture-originated pixels and the SPM data improves the accuracy of the descreening process.

22 Claims, 17 Drawing Sheets

F I G . 4
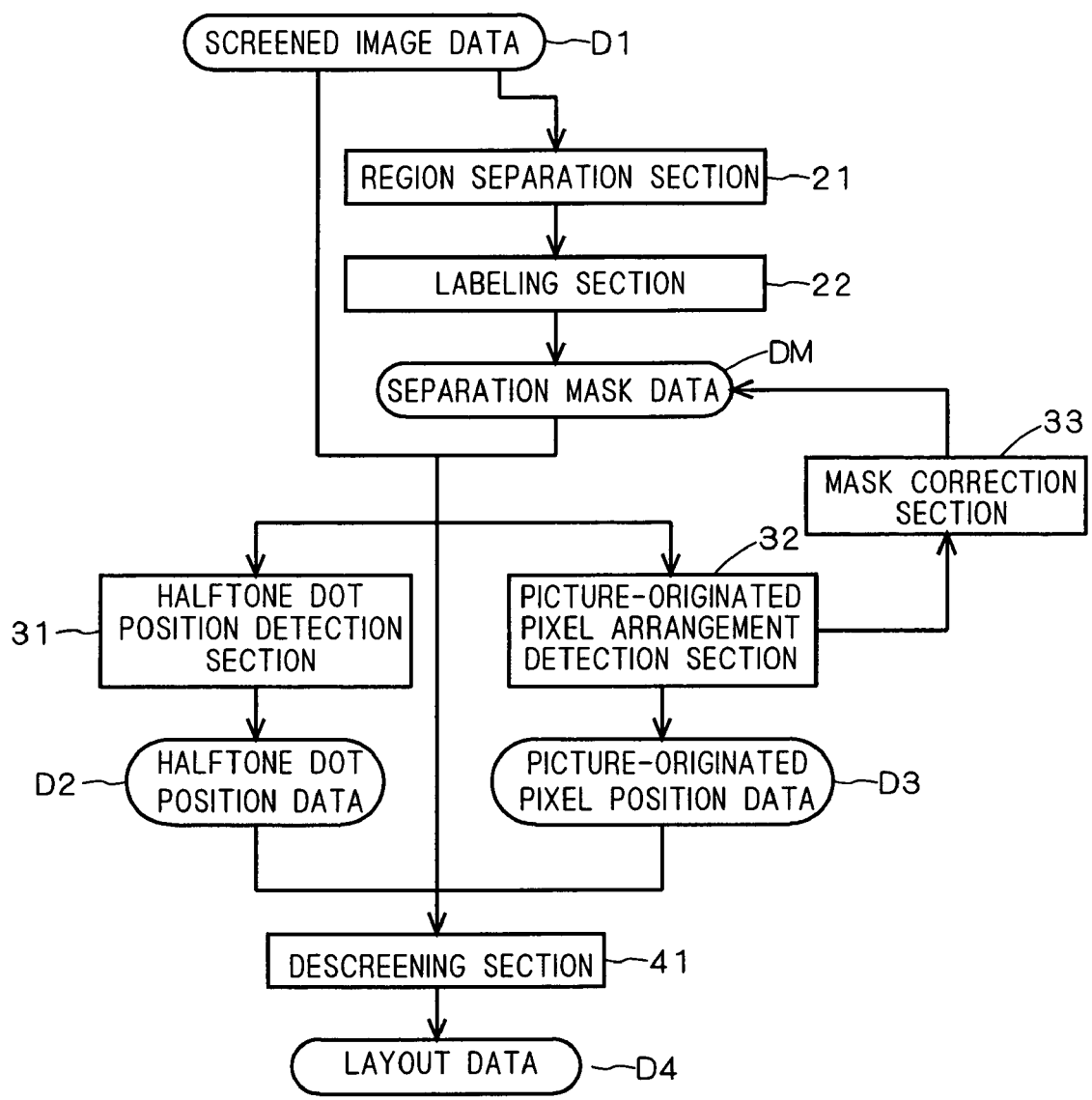

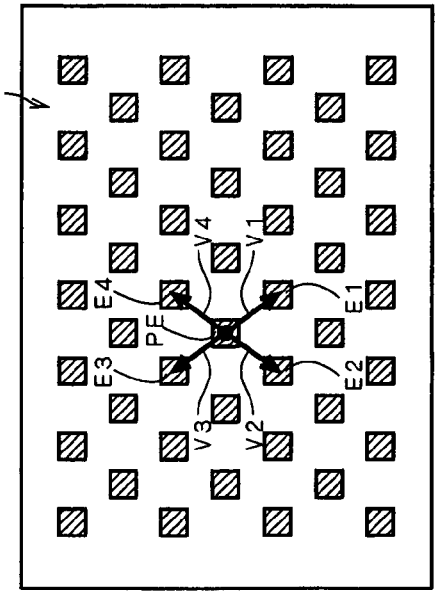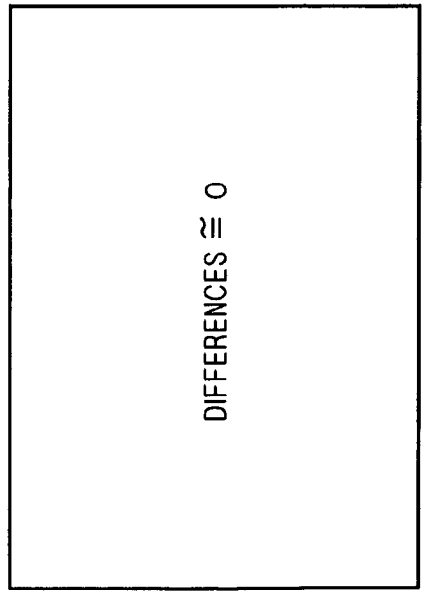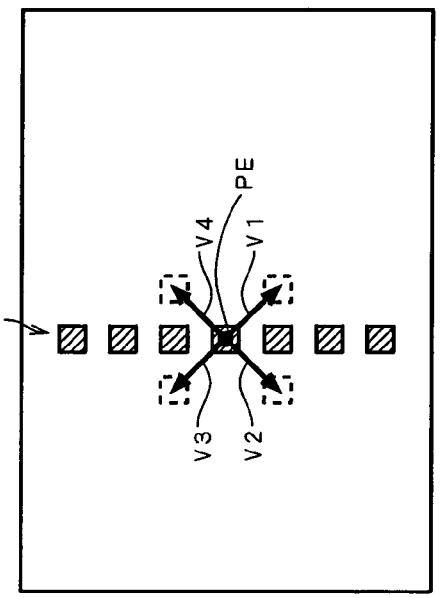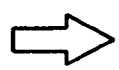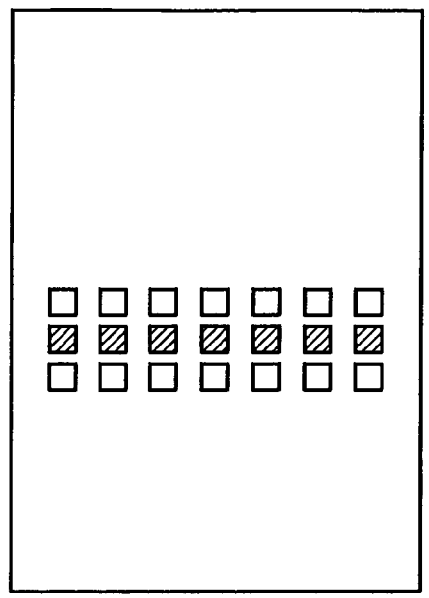

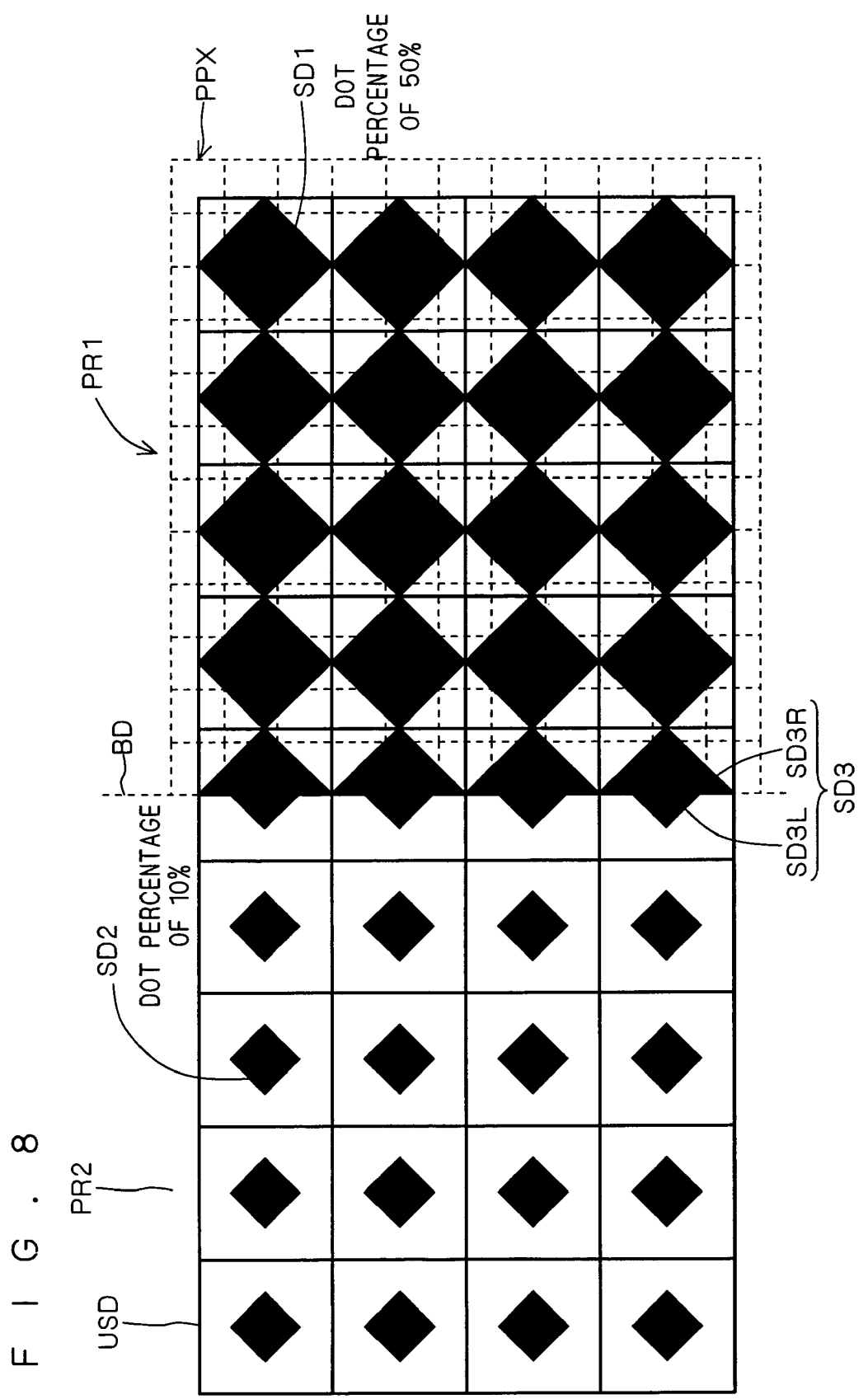

F I G . 1 3
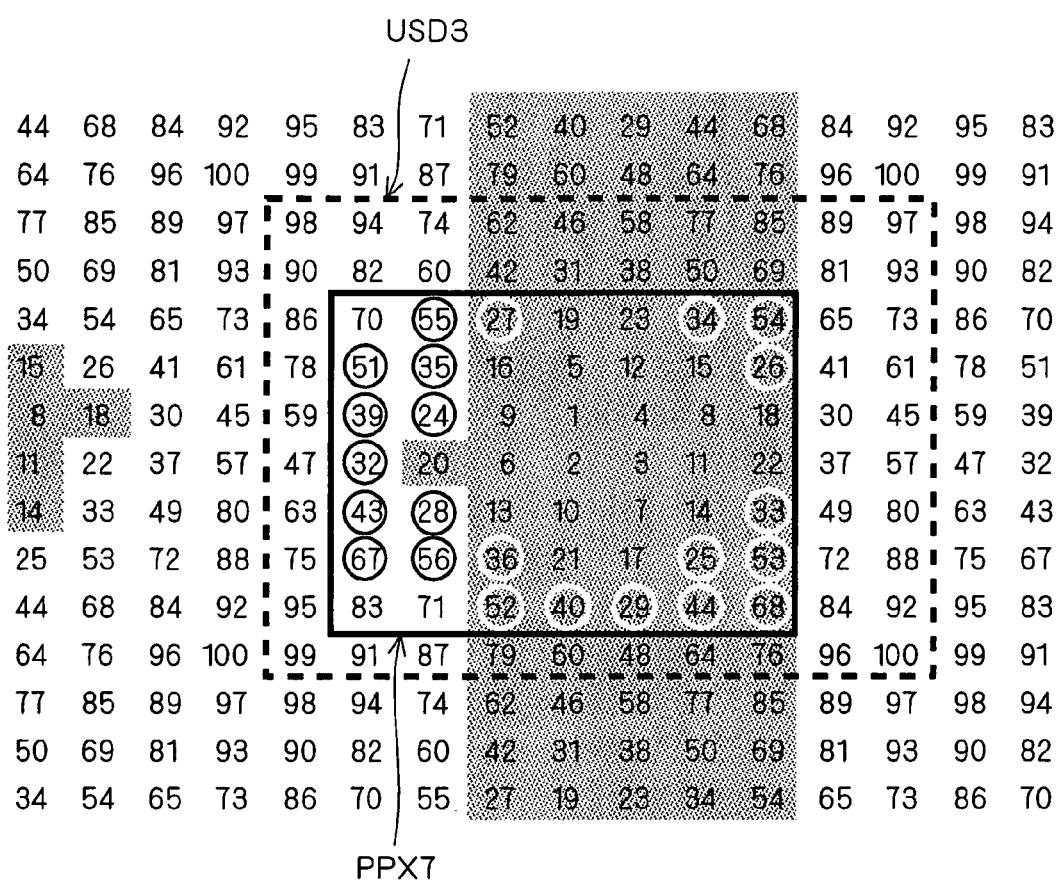

F I G . 1 4

|  |  |  |  |  |  |  |  |  |  |  |  |  |  |  |
|---|---|---|---|---|---|---|---|---|---|---|---|---|---|---|
| 44 | 68 | 84 | 92 | 95 | 83 | 71 | 52 | 40 | 29 | 44 | 68 | 84 | 92 | 95 | 83 |
| 64 | 76 | 96 | 100 | 99 | 91 | 87 | 79 | 60 | 48 | 64 | 76 | 96 | 100 | 99 | 91 |
| 77 | 85 | 89 | 97 | 98 | 94 | 74 | 62 | 46 | 58 | 77 | 85 | 89 | 97 | 98 | 94 |
| 50 | 69 | 81 | 93 | 90 | 82 | 60 | 42 | 31 | 38 | 50 | 69 | 81 | 93 | 90 | 82 |
| 34 | 54 | 65 | 73 | 86 | 70 | 55 | 27 | 19 | 23 | 34 | 54 | 65 | 73 | 86 | 70 |
| 15 | 26 | 41 | 61 | 78 | 51 | 35 | 16 | 5 | 12 | 15 | 26 | 41 | 61 | 78 | 51 |
| 8 | 18 | 30 | 45 | 59 | 39 | 24 | 9 | 1 | 4 | 8 | 18 | 30 | 45 | 59 | 39 |
| 11 | 22 | 37 | 57 | 47 | 32 | 20 | 6 | 2 | 3 | 11 | 22 | 37 | 57 | 47 | 32 |
| 14 | 33 | 49 | 80 | 63 | 43 | 28 | 13 | 10 | 7 | 14 | 33 | 49 | 80 | 63 | 43 |
| 25 | 53 | 72 | 88 | 75 | 67 | 56 | 36 | 21 | 17 | 25 | 53 | 72 | 88 | 75 | 67 |
| 44 | 68 | 84 | 92 | 95 | 83 | 71 | 52 | 40 | 29 | 44 | 68 | 84 | 92 | 95 | 83 |
| 64 | 76 | 96 | 100 | 99 | 91 | 87 | 79 | 60 | 48 | 64 | 76 | 96 | 100 | 99 | 91 |
| 77 | 85 | 89 | 97 | 98 | 94 | 74 | 62 | 46 | 58 | 77 | 85 | 89 | 97 | 98 | 94 |
| 50 | 69 | 81 | 93 | 90 | 82 | 60 | 42 | 31 | 38 | 50 | 69 | 81 | 93 | 90 | 82 |
| 34 | 54 | 65 | 73 | 86 | 70 | 55 | 27 | 19 | 23 | 34 | 54 | 65 | 73 | 86 | 70 |

CR1

PPX7

SD15

F I G . 1 7
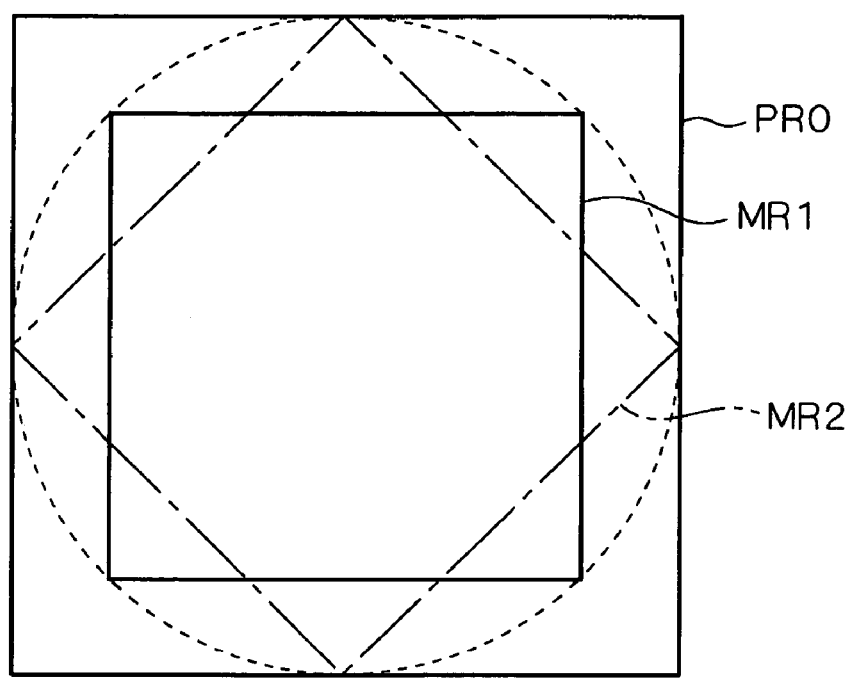

METHOD OF DESCREENING SCREENED IMAGE, METHOD OF SEPARATING SCREENED IMAGE INTO REGIONS, IMAGE PROCESSING DEVICE, AND PROGRAM

BACKGROUND OF THE INVENTION

1. Field of the Invention

The present invention relates to an image processing technique for processing digital images and, more particularly, to a technique for separating a screened image in the form of binary data into a first region from which a gradation area is to be derived and a second region from which a monotone area is to be derived, to selectively convert the first region into a multi-level gradation image.

2. Description of the Background Art

In a printing company and the like, there are cases where output using screened image data (with a resolution of, e.g., 2400 dpi) involves a need to change the screen ruling thereof or to readjust the dot gain thereof, depending on printing machines to be used. There are other cases where a change in color or tone of part of a picture image is requested for output reusing the screened image data stocked or stored after use. In these cases, it is possible to create desired screened image data again by performing a RIP process on image data (layout data) described, e.g., in PDF (Portable Document Format) from which the screened image data is generated. This technique, however, is disadvantageous in increased costs and increased processing time.

To overcome the disadvantage, another technique has been conventionally attempted which includes the steps of performing a descreening process for re-creating layout data directly from screened image data without the need to go back to the RIP process, making a desired correction, and then performing a screening process for generating screened image data again.

Specifically, the descreening process refers to the process of re-creating layout data with a resolution of about 300 to 400 dpi and having multi-level gradation mainly from a picture image portion of screened image data which is binary image data with a resolution (output resolution) of about 2400 to 4000 dpi.

In general, a picture image (including photographs and patterns) having multi-level gradation and a monotone character/line having no gradation are mixed on printed material. A screened image accordingly includes two types of regions: a first region from which a gradation area on the printed material is to be derived, and a second region from which a monotone area on the printed material is to be derived. In the first region, halftone dots are formed after the RIP process, i.e., the screening process. On the other hand, it is essentially unnecessary to perform the descreening process on the second region because the layout of binary data with a resolution as high as the output resolution is done in the step of generating the layout data. Thus, the screened image including both of the first and second regions, for example, in which a character/line is drawn on a picture is constructed to contain the first region in which halftone dots are arranged with predetermined regularity, and the character/line overlaid on the first region independently of the arrangement. It is therefore desirable that the descreening process is performed only on the first region after the first region and the second region in the screened image data are precisely separated from each other.

The technique of precisely separating the first region and the second region is also required, for example, when it is desired to extract only character information from the screened image.

There are already known such techniques for separating the first region and the second region in the screened image data. For example, Japanese Patent Application Laid-Open No. 2002-252756 discloses the technique of judging whether or not a recorder grid of interest belongs to the first region, depending on whether or not the sum of the differences between the gradation level of the recorder grid of interest and the gradation levels of four recorder grids adjacent thereto satisfies a predetermined reference value for judgment.

Simple conversion of the resolution is accomplished by uniformly performing a weighted averaging process on the screened image. This, however, presents the problem of degraded image quality, such as a generally blurred resultant image as compared with the original layout data or change in color. To solve the problem, studies have been conducted on the technique of performing the descreening process more accurately by giving consideration to the shapes of individual halftone dots. This technique is disclosed, for example, in Japanese Patent Application Laid-Open No. 2000-224415.

The high-accuracy descreening process is the process of precisely separating only the first region of interest from other regions to precisely reproduce a multi-level gradation image yet to be RIP-processed from the separated first region. Accomplishment of the process allows the re-creation of screened image data subjected to desired correction and the like without the degradation of image quality.

The use of the method of separating the first region and the second region from each other which is disclosed, for example, in Japanese Patent Application Laid-Open No. 2002-252756 will succeed in somewhat rough separation. This method, however, finds difficulty in separating a character/line overlaid on a picture image from the picture image precisely at the output resolution level (about 2400 dpi or higher). An example of this method is shown in FIG. 15. Referring to FIG. 15, the second region CR2 is shown as overlaid on the first region SR1. Conventionally, the second region CR2 might become greater in area by the amount of a region BR1 or smaller by the amount of a region BR2 with respect to a true boundary in a boundary region BR. This causes the layout data obtained by the separation process and the subsequent descreening process to present the problems that the character/line overlaid on the first region SR1 is unsharp or unnatural and that different separation processes are performed on the screened image data for respective CMYK plates.

The method of descreening is also disclosed, for example, in Japanese Patent Application Laid-Open No. 2000-224415. Although performing the process based on the shapes of individual halftone dots, this method performs the descreening process without consideration of how pixels (referred to hereinafter as picture-originated (derived) pixels) constituting the first region are arranged in the layout data yet to be binarized in the RIP process. This might cause the creation of picture-originated pixels differing in arrangement from those in the original layout data, depending on the result of the descreening process.

SUMMARY OF THE INVENTION

The present invention is intended for a method of and a device for performing a descreening process for separating a screened image in the form of binary data generated from an original image into a first region from which a gradation area is to be derived and a second region from which a monotone area is to be derived, to selectively convert the first region into a multi-level gradation image.

According to the present invention, a method of descreening a screened image comprises the steps of: (a) detecting the position of each halftone dot forming the screened image; (b) detecting from the screened image an arrangement of picture-originated pixels in a gradation area of an image from which the screened image is generated; and (c) generating layout data having multi-level gradation from the screened image, the step (c) including the steps of (c-1) bringing predetermined threshold values into correspondence with individual recorder grids constituting each halftone cell determined in the step (a), and (c-2) setting gradation levels in the gradation area for descreened layout data, the gradation levels in the gradation area being set based on a correspondence between the predetermined threshold values and whether or not the recorder grids present in the position of each of the picture-originated pixels contribute to halftone dot formation.

This method performs the descreening process based on information about the arrangement of the picture-originated pixels in the image from which the screened image is generated, to improve the reproducibility of the image from which the screened image is generated, thereby preventing the degradation of image quality.

Preferably, the descreening method according to the present invention further comprises the steps of (d) separating a first region from which the gradation area is to be derived and a second region from which a monotone area is to be derived from each other by using a separation mask, and (e) specifying inconsistent recorder grids forming each halftone dot and having a contradiction between a result of an assumption that binarization is performed using the threshold values brought into correspondence in the step (c-1) and an actual state of binarization, to correct the separation mask based on a positional relationship between the inconsistent recorder grids in each halftone cell. The descreening is performed only on the first region.

The descreening process is performed on other than the second region in which layout has been done at an output resolution level, whereby the efficiency of the process is improved. The method is capable of correcting the separation mask at the recorder grid level to separate the second region more precisely. This improves the reproducibility of the image from which the screened image is generated in the descreening process to prevent the degradation of image quality.

It is therefore an object of the present invention to provide a method of and a device for performing a descreening process on a screened image data containing both a picture image and a character/line with high accuracy without degradation of image quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic data flow diagram to the generation of layout data in a descreening process;

FIGS. 5A and 5B illustrate the process of judging to which region individual halftone dots belong;

FIGS. 8, 9A and 9B illustrate the detection of a boundary between two first regions having different dot percentages;

FIG. 13 shows a picture-originated pixel in which inconsistent recorder grids arise;

FIG. 14 shows an example of the result of estimation of a second region from which a monotone area is to be derived in the picture-originated pixel having inconsistent recorder grids;

FIG. 17 is a view illustrating areas for summation during halftone dot position detection.

DESCRIPTION OF THE PREFERRED EMBODIMENTS

<Device Construction>

Figure 1:
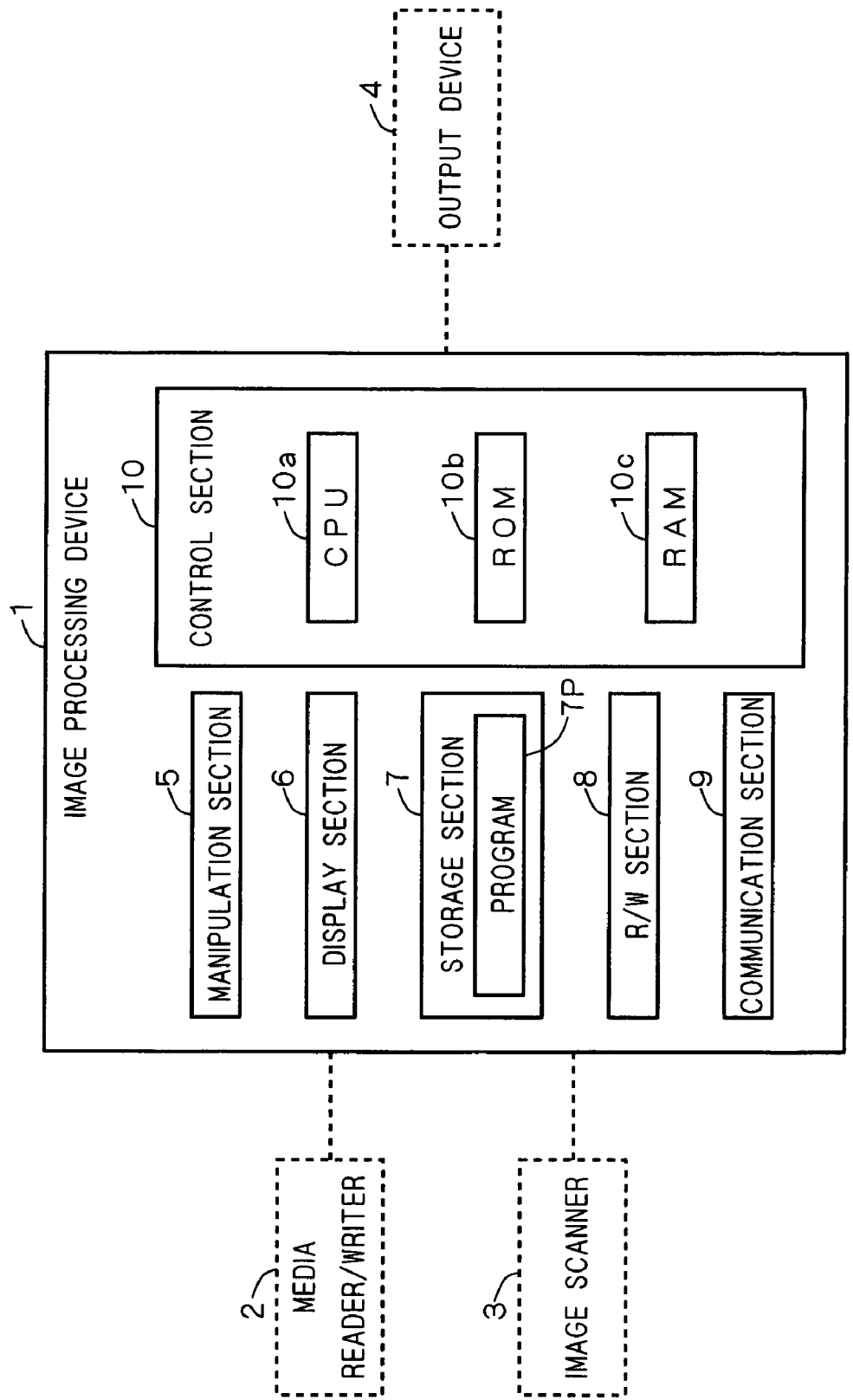
FIG. 1 is a schematic diagram of an image processing device according to the present invention.

FIG. 1 is a schematic diagram of an image processing device 1 according to a preferred embodiment of the present invention. The image processing device 1 generates a separation mask for separating screened image data into a first region from which a gradation area is to be derived and a second region from which a monotone area is to be derived, and then performs a region separation process for correcting the separation mask at an output resolution level to separate the first region from the screened image data. In parallel with the region separation process, the image processing device 1 performs a descreening process for generating multi-level gradation data from the first region. Thereafter, the image processing device 1 performs a screening process for generating screened image data from the multi-level gradation data. In this preferred embodiment, the concept of "character" includes a numeric character.

The image processing device 1 is connected to a media reader/writer 2 including, for example, an MO drive or a CD-R/RW drive for reading various print data such as screened image data from various portable recording media such as an MO (magneto-optical) disk or a CD-R/RW disk, to an image scanner 3 for scanning a prepress film to directly generate the screened image data, and to an output device 4, such as a digital printing machine, which receives the screened image data to be outputted from the image processing device 1 to provide a predetermined output based on the screened image data. That is, the media reader/writer 2 and the image scanner 3 correspond to data input devices for the image processing device 1. Additionally, the image processing device 1 may be capable of receiving print data or the like directly from other devices through a network (not shown) connected to a communication section 9 to be described later.

The image processing device 1 is implemented by a computer. Specifically, the image processing device 1 principally comprises: a manipulation section 5 including a mouse and a keyboard for inputting various commands by an operator; a display section 6 such as a display device; a storage section 7 including a hard disk for storing a program 7p for causing the computer to function as the image processing device 1 and the like; an R/W section 8 for reading and writing data from and to various portable recording media via the media reader/writer 2; the communication section 9 serving as an interface for transferring data to and from other connected devices and devices on the network (not shown) through signal lines or by radio transmission; and a control section 10 including a CPU 10a, a ROM 10b and a RAM 10c for implementing functions to be described later.

In the image processing device 1, a so-called GUI (Graphical User Interface) capable of processing while displaying the details of manipulation through the manipulation section 5 and the current status of various processes on the display section 6 is implemented by the functions of the control section 10, the manipulation section 5 and the display section 6. Processes in respective components to be described later which are implemented in the control section 10 are also carried out using the GUI.

Figure 2:
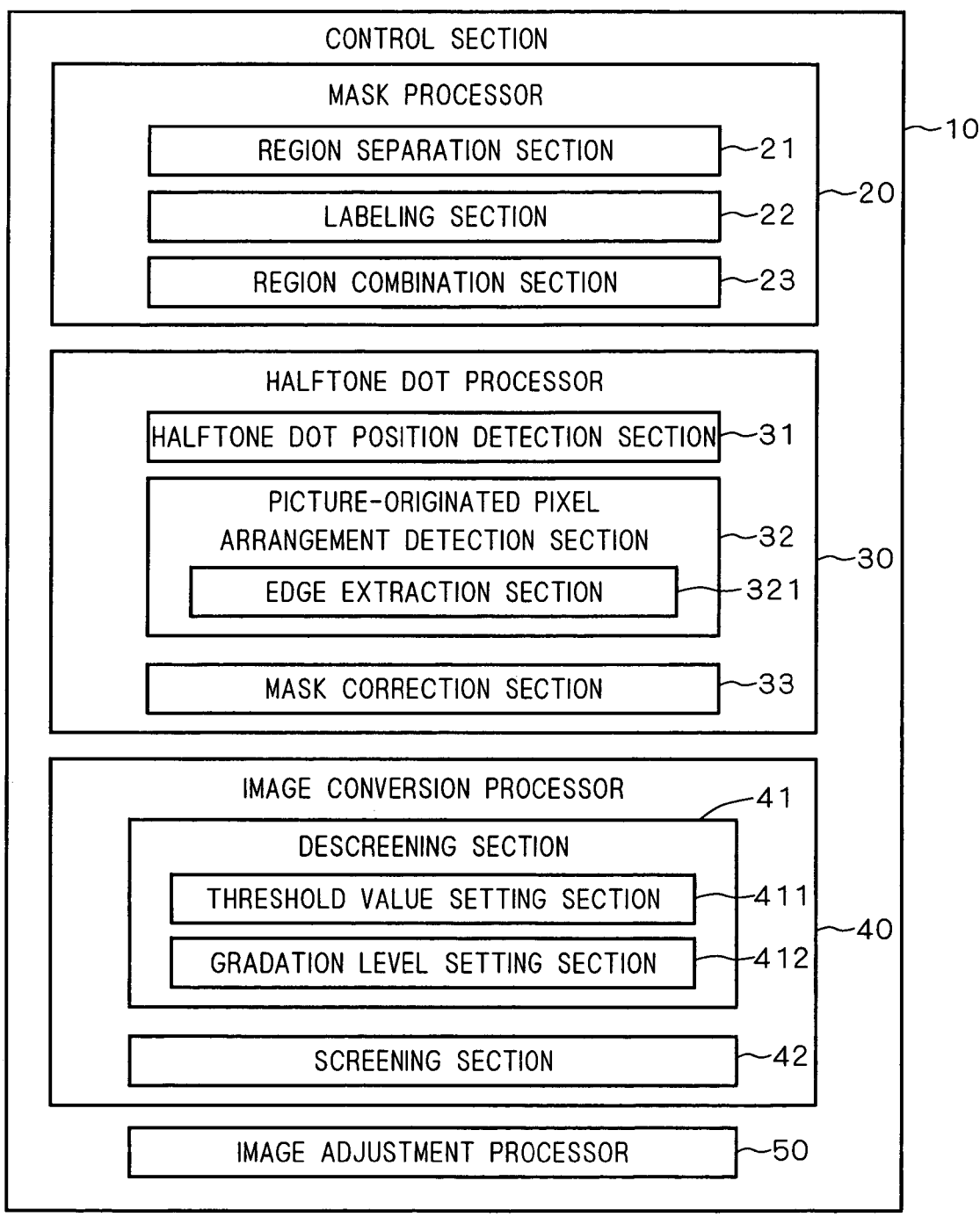
FIG. 2 is a diagram for illustrating functions implemented in a control section of the image processing device.

FIG. 2 is a diagram for illustrating the functions implemented in the control section 10 of the image processing device 1.

The predetermined program 7p stored in the storage section 7 is executed by the CPU 10a, the ROM 10b and the RAM 10c to cause a mask processor 20, a halftone dot processor 30, an image conversion processor 40 and an image adjustment processor 50 to be principally implemented in the control section 10.

The mask processor 20 is principally responsible for processes relating to the separation and combination (recombination) of the first region and the second region. To this end, the mask processor 20 includes a region separation section 21, a labeling section 22, and a region combination section 23.

The region separation section 21 is responsible for the process of judging whether individual halftone dots are present in the first region or in the second region, thereby to generate separation mask data DM serving as a separation mask for extracting the first region. The process performed in the region separation section 21 is implemented, for example, by using the known technique disclosed in Japanese Patent Application Laid-Open No. 2002-252756. Thus, the region separation section 21 serves as an element for acquiring the separation mask.

When a screened image contains a plurality of first regions, the labeling section 22 is responsible for the process of labeling the plurality of first regions, i.e., masks corresponding to the respective first regions. A variety of known labeling methods are applicable to the labeling process. One of such labeling methods is disclosed, for example, in Japanese Patent Application Laid-Open No. 1-302475 (1989).

The region combination section 23 is responsible for the process of combining screened image data about the first region subjected to the separation process by the separation mask, the subsequent descreening process, the correction process, and the screening process again in the order named, with screened image data about the second region remaining the same as it was prior to the separation process, to generate single new screened image data.

The halftone dot processor 30 is responsible for processes required to obtain position information about individual halftone dots and position information about the first region in a coordinate system using a recorder grid as a unit, the position information being required for the process of correcting the separation mask data DM. The position information about individual halftone dots and position information about the first region are also used to perform the descreening process on the screened image data about the first region. To this end, the halftone dot processor 30 includes a halftone dot position detection section 31, a picture-originated pixel arrangement detection section 32, and a mask correction section 33.

The halftone dot position detection section 31 is responsible for the process of detecting the screen angle, screen ruling and halftone dot coordinate values of a screened image formed by the screened image data. This preferred embodiment is characteristic in that these pieces of information are detected based on a change in spacing between halftone dots which is obtained by observing the screened image in one direction while theoretically rotating the screened image.

The picture-originated pixel arrangement detection section 32 is responsible for the process of detecting the arrangement of picture-originated pixels in layout data from which the screened image is generated, based on the shapes of halftone dots positioned on a boundary between the first region and the second region or on a boundary between individual first regions in the screened image formed by the screened image data. This preferred embodiment is characteristic in that the picture-originated pixel arrangement detection section 32 includes an edge extraction section 321 for extracting the edges of halftone dots, and gives attention to a gradation level change characteristic of the boundary between different regions, thereby to precisely specify the arrangement of the picture-originated pixels on the order of recorder grids or at the output resolution level.

The mask correction section 33 is responsible for a correction process for making the separation mask temporarily established in the region separation section 21 more precise. Although effective for rough separation of regions, the process performed in the region separation section 21 cannot necessarily precisely specify the boundary between the first and second regions. For this reason, this preferred embodiment performs the process of correcting the separation mask under the action of the mask correction section 33 through the use of the presence of inconsistent recorder grids to be described later, to accomplish the separation of regions as precise as at the output resolution level.

The image conversion processor 40 performs the descreening process for converting the screened image data about the first region into multi-level gradation data to generate new layout data while judging whether or not the separation mask data DM temporarily generated in the mask processor 20 precisely separates the regions, that is, requires correction. The image conversion processor 40 also performs the screening process for converting the layout data which is the multi-level gradation data into screened image data, in inverse relation to the descreening process. The image conversion processor 40 includes a descreening section 41 and a screening section 42 in corresponding relation to the descreening and screening processes. The descreening section 41 includes a threshold value setting section 411 for bringing predetermined threshold value data to be applied in the screening process into correspondence with halftone cells determined by the detection of the halftone dot positions in the halftone dot position detection section 31, and a gradation level setting section 412 for setting a gradation level in the gradation area to be possessed by each of the picture-originated pixels generated by the descreening process, based on the positions of the halftone dots and the arrangement of the picture-originated pixels detected by the picture-originated pixel arrangement detection section 32. In this preferred embodiment, since the descreening process is performed using the information required for the judgment as to whether or not the separation mask data DM requires correction, the gradation level setting section 412 also serves as a judging element for judging whether or not the separation mask data DM requires correction.

The image adjustment processor 50 is responsible for various adjustment and correction processes for a picture image represented by the multi-level gradation data. Thus, the processes of changing the color and density of the picture image and correcting the tone curve and gray balance thereof are implemented by the function of the image adjustment processor 50.

<Generation of Separation Mask>

Figure 3:
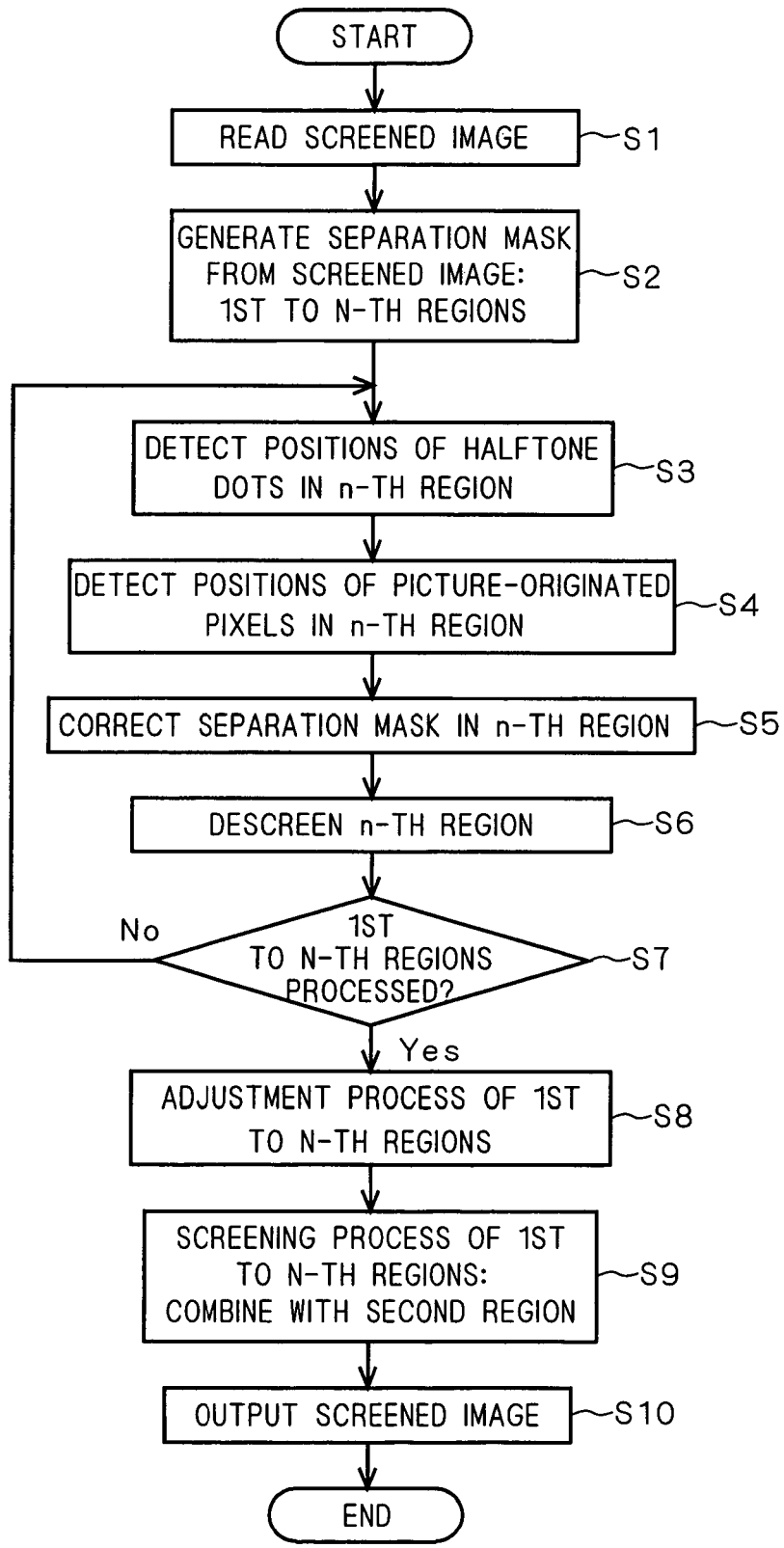
FIG. 3 is a flowchart showing process steps performed in the image processing device.

The details of the processes in the respective sections implemented in the control section 10 will be described one by one in accordance with the procedure. FIG. 3 is a flowchart showing the processes in the image processing device 1. FIG. 4 is a schematic data flow diagram to the generation of the layout data in the descreening process.

First, screened image data D1 to be subjected to the descreening process is read from the storage section 7 or from a predetermined recording medium inserted in the media reader/writer 2 (in Step S1). Alternatively, the image processing device 1 may be adapted to generate the screened image data D1 directly from a prepress film scanned by the image scanner 3. When handling a color printed material, the image processing device 1 processes a plurality of screened image data for respective colors of CMYK. Since the processes for the plurality of screened image data are similar to each other, the process for the single screened image data D1 will be described hereinafter.

After the screened image data D1 is read, the generation of the separation mask and the labeling are carried out under the action of the region separation section 21 and the labeling section 22 (in Step S2). These processes will be briefly described because the known technique is used for the processes as described above.

FIGS. 5A and 5B illustrate the process of judging whether individual halftone dots belong to the first region or to the second region during the region separation in the region separation section 21. FIG. 5A schematically shows a distribution of halftone dots having approximately equal dot percentages in the first region SR. FIG. 5B schematically shows a linear line represented by halftone dots in the second region CR. During the region separation, the gradation level of a recorder grid is defined as "255" when the recorder grid forms a screened image, and is defined as "0" when the recorder grid forms no screened image, for purposes of convenience. A reference character PE designates an objective recorder grid to be judged, and E1 to E4 designate four recorder grids present in positions displaced respective vectors V1 to V4 from the objective recorder grid PE, the vectors V1 to V4 being determined from the screen ruling and the screen angle. To which region the objective recorder grid PE belongs is judged based on a comparison between the sum RV of values Va1 to Va4, divided by four, and a predetermined threshold value Vs (e.g., Vs=128), where the values Va1 to Va4 are the absolute values of differences (absolute differences) between the gradation level of the objective recorder grid PE and the gradation levels of the four recorder grids E1 to E4, respectively. The screen ruling and screen angle used herein may be those calculated in the halftone dot position detection process to be described later, in which case the process in Step S3 to be described below is performed on the entire screened image data at the same time.

As shown in FIG. 5A, the objective recorder grid PE and the four adjacent recorder grids E1 to E4 have approximately equal gradation levels in the first region SR containing a succession of halftone dots representing approximately equal median gradation levels. Therefore, the absolute differences Va1 to Va4 are small (ideally, the absolute differences equal zero), and the sum RV is accordingly small. Thus, there is a high probability that the objective recorder grid PE is within the first region SR, when the sum RV is less than the threshold value.

As shown in FIG. 5B, on the other hand, a line is present locally in many cases to provide a nonuniform distribution of gradation levels in the second region CR. Therefore, the gradation level of the objective recorder grid PE often significantly differs from the gradation levels of the four adjacent recorder grids E1 to E4, and the sum RV of the absolute differences is accordingly large. Thus, there is a high possibility that the objective recorder grid PE is within the second region CR, when the sum RV is large.

Based on such principles, a judgment is made as to whether each of the recorder grids is present within the first region or within the second region. Adjusting the setting of the threshold value enables discrimination between a plurality of first regions. As a result, position information data about all of the recorder grids judged to be within the first region(s) is the separation mask data DM.

The method of generating the separation mask data DM is not limited to that described above. For example, the separation mask data DM may be generated by performing a predetermined shrinking process on the screened image data to specify the second region.

The separation mask data DM thus obtained indicates only whether or not the recorder grids are contained in the first regions. The labeling process for attaching labels for discrimination between the first regions is subsequently carried out under the action of the labeling section 22.

The labeling process is implemented by judging a succession of recorder grids judged to be present within the first regions. Specifically, a judgment is made as to whether or not each recorder grid constituting the screened image is in the same region (in the same first region or in the same second region) as its adjacent recorder grid. A new label is attached each time a new set of recorder grids judged to constitute the same first region in succession is detected, whereby all of the first regions are labeled. Labeling information thus established is added to the separation mask data DM.

The separation mask is obtained by newly creating the separation mask in the above description. Instead, if the separation mask data is previously generated in corresponding relation to the screened image being processed, the separation mask data may be acquired by reading from the media reader/writer 2 and be subjected to subsequent processes. In this case, the media reader/writer 2 serves as an element for acquiring the separation mask.

<Detection of Halftone Dot Positions>After the separation mask is generated as described above, the halftone dot positions are detected for each first region (in Step S3). It is assumed that N first regions (first to N-th regions) are present in the screened image.

Figure 6:
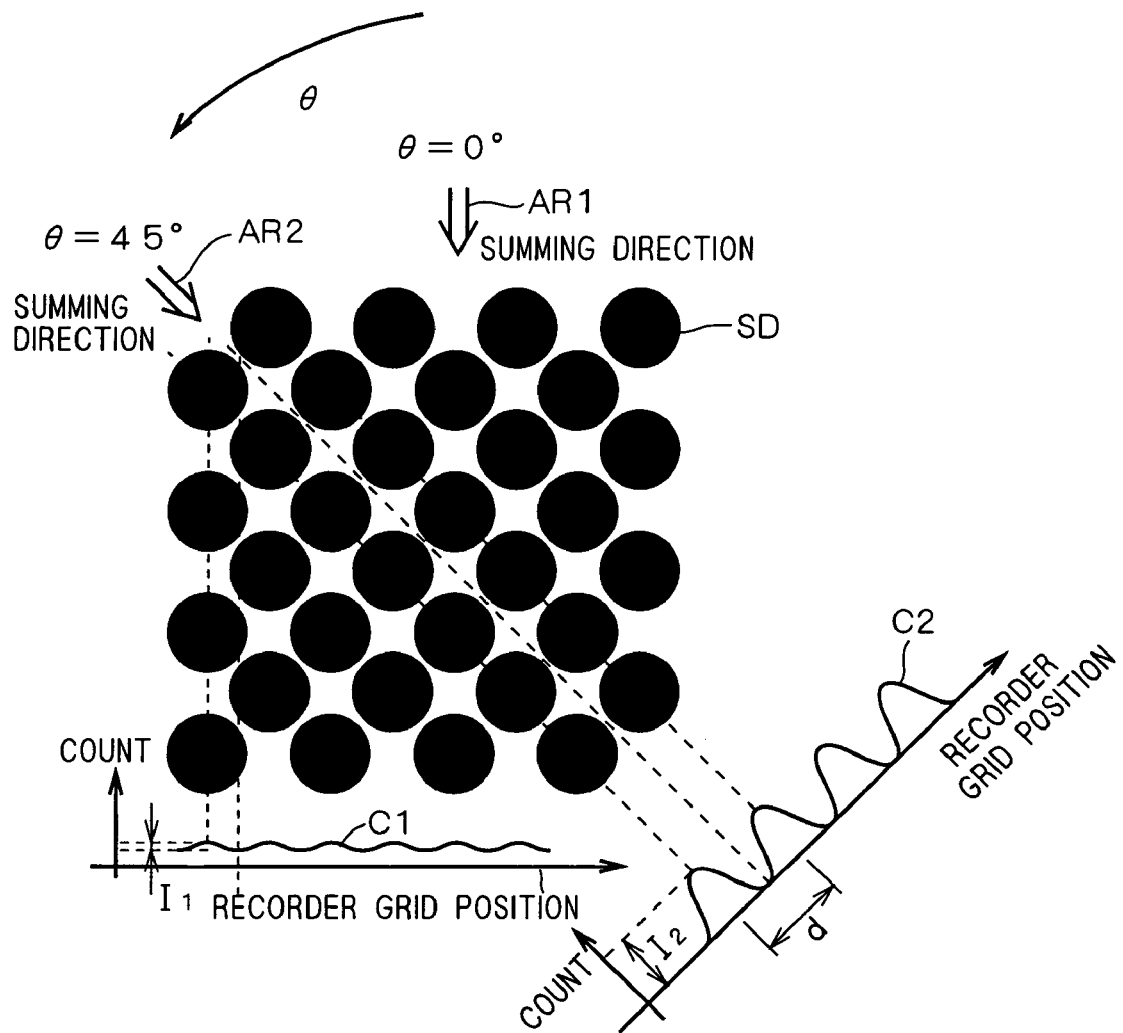
FIGS. 6 and 7 illustrate a halftone dot position detection process for a first region from which a gradation area is to be derived.
Figure 7:
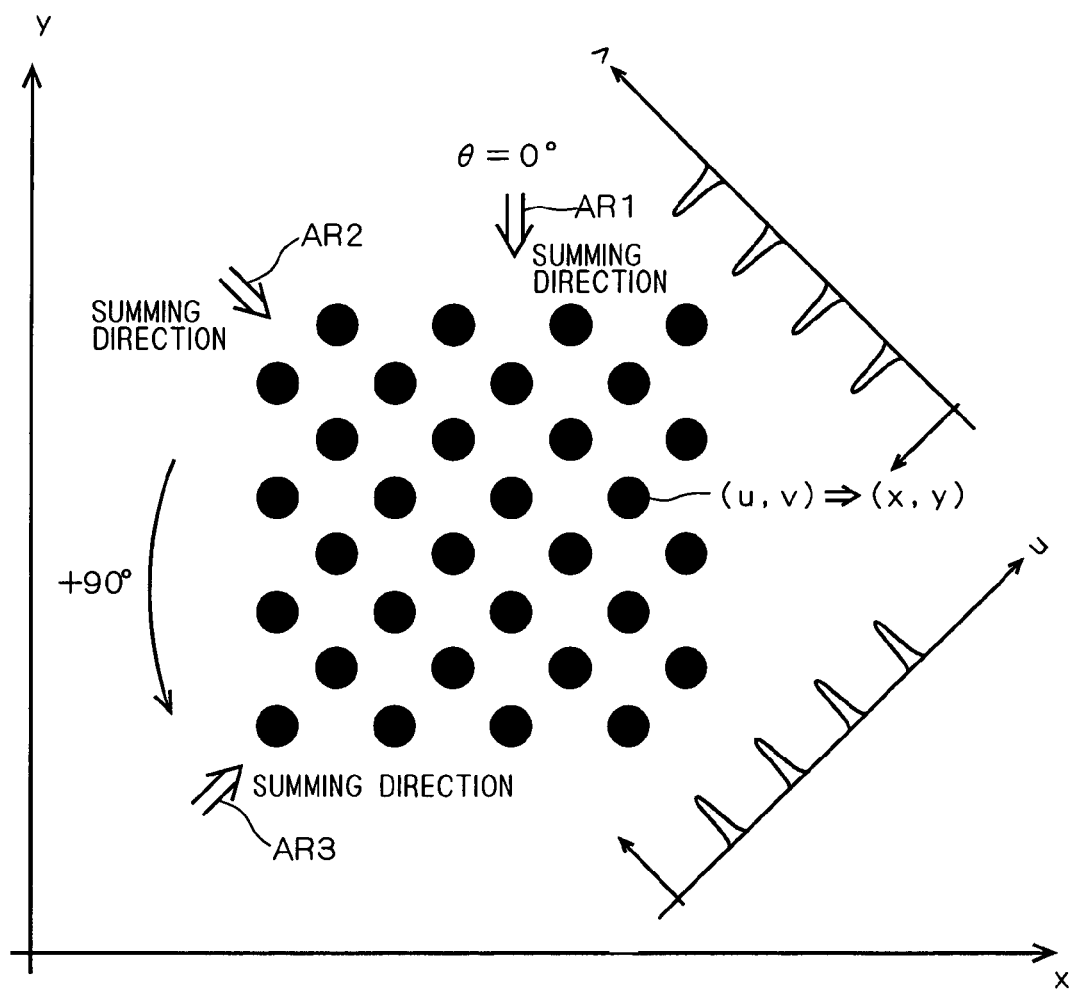

FIGS. 6 and 7 illustrate the halftone dot position detection process for an n-th region (n is an integer ranging from 1 to N) which is one of the first regions, in the halftone dot position detection section 31.

In this preferred embodiment, the halftone dot position detection section 31 carries out the process of sequentially summing up the gradation levels of all recorder grids in a projective manner in one direction while theoretically rotating the screened image, as schematically illustrated in FIG. 6. For purposes of illustration, summing directions are shown in FIG. 6 as rotated. It is assumed that the direction indicated by the arrow AR1 is a direction representing the zero point (θ=0°) of the rotation angle θ of the screened image. The reference character C1 denotes a count curve (count distribution) indicating a relationship between the count obtained by summing up the gradation levels in the direction indicated by the arrow AR1 and the recorder grid position, and C2 denotes a count curve in the direction of θ=45° indicated by the arrow AR2.

The areas subjected to the summation are determined to be equal in size without extending outwardly of the first regions when the summation process is performed in any summing direction. FIG. 17 illustrates such areas of the summation when the first region is rectangular in shape. For the first region PR0 shown in FIG. 17, a measurement region MR1 is subjected to the summation process when the summation process is carried out in the direction represented by θ=0°, and a measurement region MR2 is subjected to the summation process when the summation process is carried out in the direction represented by θ=45°. In this case, the measurement regions MR1 and MR2 are determined so as to appear the same when rotated relative to each other.

Performing the summation process on such measurement regions provides data indicating a correspondence between the recorder grid position and the count (the sum of the gradation levels). The count curve is such a curve that a peak value is reached at a recorder grid position where the count is the highest, and the count at a recorder grid position not contributing to the formation of halftone dots equals zero. When the summation process is performed similarly while rotating the screened image, the shape of the count curve, i.e. the magnitude of peaks and spacings between the peaks, changes with the angle of rotation. The more uniform the spacings between the halftone dots in a direction perpendicular to the summing direction, the smaller a variation in count with respect to the recorder grid position, i.e. a difference between a maximum value and a minimum value. A summing direction such that the change in halftone dot spacing in a direction perpendicular to the summing direction is more significant results in a greater difference between a maximum value and a minimum value. Thus, the calculation of a change in count variations for the angle θ allows the detection of a direction in which the halftone dots are spaced most closely, i.e., the screen angle θs. In the case of the screened image shown in FIG. 6, the count curve C1 varies little and the variation I1 is also small when θ=0°. For the screened image shown in FIG. 6, the variation I2 of the count curve C2 when θ=45° corresponds to the greatest variation in count. Therefore, the screen angle θs is determined as 45°.

The spacing between the peaks corresponding to maximum values of the count curve at the time that this screen angle is determined corresponds to the center-to-center spacing d of halftone dots. Therefore, the screen ruling L for the n-th region is calculated as the inverse of the center-to-center spacing d.

In CMYK multicolor printing, a set of known values such as 0°, 15°, 45° and 75° are often used as the screen angle. Therefore, the image processing device 1 may be adapted to determine the screen angle by making a comparison between the changes in count for near these known screen angles in place of finding the changes in count for a given angle.

After the screen angle θs and the screen ruling L are determined, the central position of each halftone dot is subsequently determined. FIG. 7 illustrates the determination of the central position of each halftone dot.

A u-axis is defined to extend in a direction of the coordinate axis for indicating the recorder grid position or in a direction perpendicular to the summing direction at the time that the screen angle θs is determined. After the determination of the screen angle θs, the screened image is further rotated through 90° from the determined angle, and then the counts are calculated in the resultant direction as indicated by the arrow AR3. A v-axis is defined to extend in a direction perpendicular to the summing direction at this time. Then, the center of a halftone dot is positioned to satisfy both a peak position on the u-axis and a peak position on the v-axis. In other words, an intersection point of a pair of straight lines passing through the middles of peaks on the u- and v-axes, respectively, in a coordinate space defined by the u-axis as a horizontal axis and the v-axis as a vertical axis corresponds to the central position of one halftone dot. Thus, the coordinates of the central position of each halftone dot are determined as coordinates (u, v) in a u-v coordinate system. An affine transformation is performed to convert the coordinates (u, v) in the u-v coordinate system into an absolute coordinate system (referred to as an x-y coordinate system) determined independently of rotation, thereby providing the central position (x, y) of each halftone dot present in the first region accurately at the output resolution level. Further, a halftone cell USD (in FIG. 8) in the screened image data D1 is determined from the central position (x, y) of each halftone dot and the screen ruling L. Data about the halftone dot positions is referred to hereinafter as halftone dot position data D2.

<Detection of Arrangement of Picture-Originated Pixels>

Figure 9A:
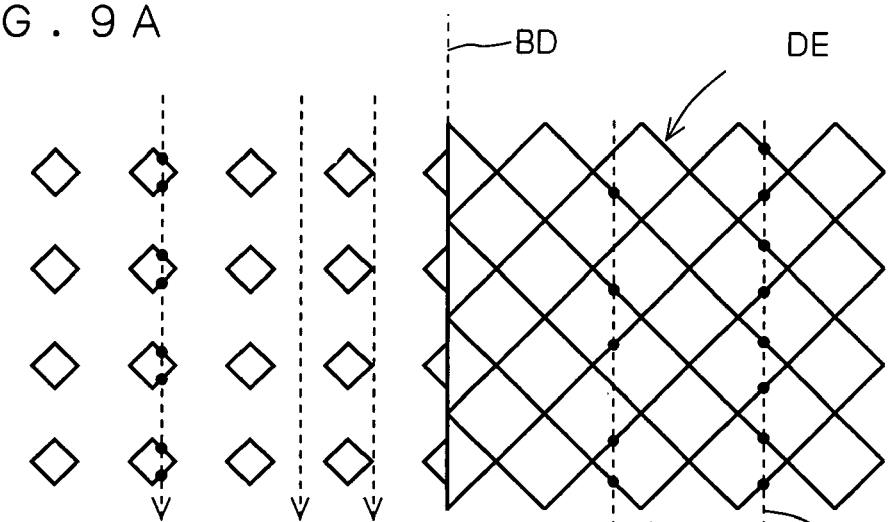
Figure 9B:
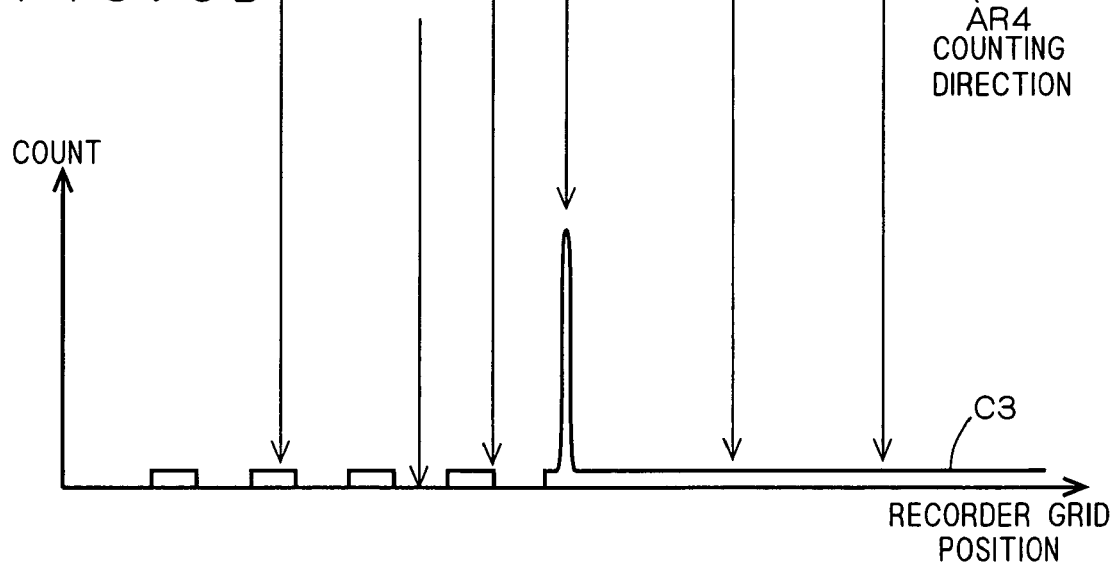

Next, description will be given on the process of detecting the arrangement of picture-originated pixels in the gradation area which is implemented under the action of the picture-originated pixel arrangement detection section 32. FIGS. 8, 9A and 9B illustrate the detection of a boundary between two first regions having different dot percentages. Referring to FIG. 8, it is assumed that a region to the right of the boundary BD is the first region PR1 containing halftone dots SD1 having a dot percentage of 50%, and a region to the left of the boundary BD is the first region PR2 containing halftone dots SD2 having a dot percentage of 10%. Each of the rectangular regions enclosed by solid lines indicates the halftone cell USD corresponding to a halftone dot with a dot percentage of 100%. Each of the rectangular regions enclosed by dotted lines corresponds to a picture-originated (or picture-derived) pixel PPX conceivable in the first regions. Although picture-originated pixels PPX are conceivable both in the first regions PR1 and PR2, the picture-originated pixels PPX in the latter are not shown for purposes of simplicity.

The boundary BD between the first regions PR1 and PR2 having different dot percentages is also a boundary between picture-originated pixels PPX. However, since the boundary between the picture-originated pixels PPX, in general, does not coincide with a boundary between halftone cells USD, there are cases where the boundary between the picture-originated pixels PPX lies within the halftone cells USD, as shown in FIG. 8. In such cases, a halftone dot SD3 lying on the boundary between the first regions, i.e., on the boundary between the picture-originated pixels PPX is shaped to consist of right-hand and left-hand halftone dot portions SD3R and SD3L joined together on the boundary BD. From another point of view, the halftone dots SD1 and SD2 lying in the respective first regions can be said to be deformed. With attention directed to this consideration, this preferred embodiment detects a junction between the halftone dots thus deformed to specify the boundary between the first regions, i.e. the boundary between the picture-originated pixels PPX, at the output resolution level, thereby specifying how the picture-originated pixels are arranged in the layout data yet to be screened.

To detect the boundary BD in this preferred embodiment, the edge extraction section 321 acts to extract edges of the halftone dots constituting the screened image. A known edge extraction process, e.g. a Laplacian filter, is applicable to the screened image. This provides edge extraction data DE about the halftone dots SD1, SD2 and SD3 as shown in FIG. 9A from the screened image shown in FIG. 8. In this process, the gradation level of recorder grids corresponding to an edge is set at "1" and the gradation level of other recorder grids is set at "0." Next, the recorder grids containing edges are counted in a predetermined direction, based on the edge extraction data DE.

FIG. 9B shows an edge count curve (count distribution) C3 indicating the result of counting in the direction of the arrow AR4 of FIG. 9A. As a result of such a counting process, the counts are approximately equal to each other in the first region PR1 having the dot percentage of 50%. In the first region PR2 having the dot percentage of 10%, the edge count is zero where the halftone dots SD2 are absent, but the counts equal to those in the first region PR1 is obtained where the halftone dots SD2 are present. On the other hand, since the halftone dots SD3 lying in the recorder grid position corresponding to the boundary BD are deformed as described above, the halftone dots SD3 have edges (i.e., a spikelike sharp peak is formed in terms of the count) on the boundary BD between the right-hand and left-hand portions SD3R and SD3L. As a result of the summation in the direction of the arrow AR4, the count where the halftone dots SD3 are present is significantly higher than those in the left-hand and right-hand first regions PR1 and PR2. In other words, the edge count curve C3 has a peak in a recorder gird position corresponding to the boundary between the picture-originated pixels belonging to different first regions.

The above-mentioned process is carried out in two directions perpendicular to each other to provide respective pieces of peak position information, thereby detecting peaks corresponding to the boundary positions of the picture-originated pixels. Since the information about a multiplicity of boundaries are statistically obtained, the minimum spacing between the peak positions is presumed to correspond to the spacing between the picture-originated pixels, that is, the resolution. Therefore, how the original picture-originated pixels are arranged is presumed by dividing the screened image into sections having a size equal to the peak-to-peak spacing, based on the peaks corresponding to the high counts.

Although the summing direction is shown as extending along the boundary BD between the first regions in FIGS. 8, 9A and 9B for purposes of simplicity, there is in general no practical problems when the summing direction does not coincide with the direction extending along the boundary BD. Because the resolution of the picture-originated pixels PPX is lower than the output resolution, a plurality of adjacent recorder grids almost always form a boundary.

The execution of the above-mentioned process in two directions perpendicular to each other allows the precise grasp of the boundary between the first regions at the output resolution level as high as the halftone dot positions in the coordinate system represented on the order of recorder grids. Information about the boundary positions of the picture-originated pixels which is obtained by the picture-originated pixel position detection process is referred to hereinafter as picture-originated pixel position data D3.

<Correction of Separation Mask and Descreening Process>

The detection of the halftone dot positions and the detection of how the picture-originated pixels are arranged allow the positional relationship therebetween to be determined in a single coordinate system represented on the order of recorder grids. Referring again to FIG. 3, the high-precision correction of the separation mask (in Step S5) and the descreening process with image quality maintained (in Step S6) are subsequently carried out based on the halftone dot position data D2 and the picture-originated pixel position data D3. Although shown as performed independently for purposes of illustration, these processes in the respective steps are actually integrally performed. For ease of description, the screening process and the descreening process will be described first.

FIGS. 10A, 10B, 10C and 10D illustrate the screening process. For simplicity of discussion, it is assumed that a halftone cell USD1 contains 10×10=100 recorder grids SPX1. It is also assumed that the halftone cell USD1 corresponds to nine picture-originated pixels PPX1 having the same gradation level, i.e., forming the same picture image, and contains no boundary between the first regions.

Figure 10A:
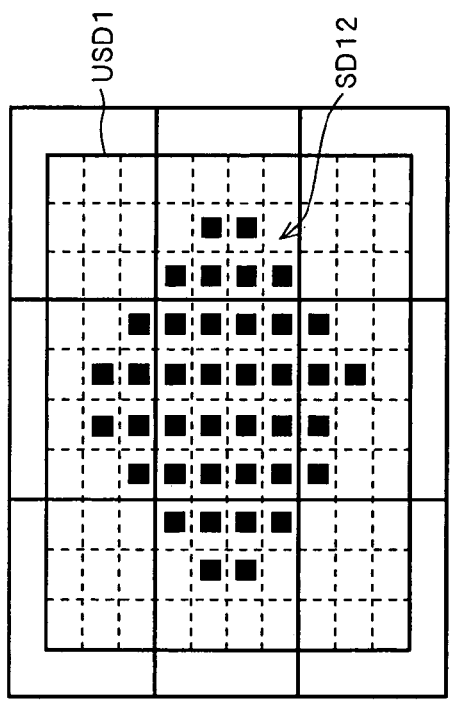
FIGS. 10A, 10B, 10C and 10D illustrate a screening process.

The screening process is the process of providing a predetermined gradation level as a threshold value to each of the recorder grids SPX1 constituting the halftone cell USD1, to construct a halftone dot using only recorder grids SPX1 whose threshold values are less than the gradation level of the picture-originated pixels PPX1. Data about the threshold values established for the individual recorder grids of the halftone cell USD1 is referred to as SPM data. A threshold value established for each of the recorder grids is referred to as an SPM value. FIG. 10A illustratively shows that the SPM data is established for the halftone cell USD1 having the 100 recorder grids SPX1. Referring to FIG. 10A, the SPM values in ascending order are given to the recorder girds SPX1, starting from a recorder grid lying in the center so that the single halftone cell USD1 can represent 101 levels of gradation.

Figure 10B:
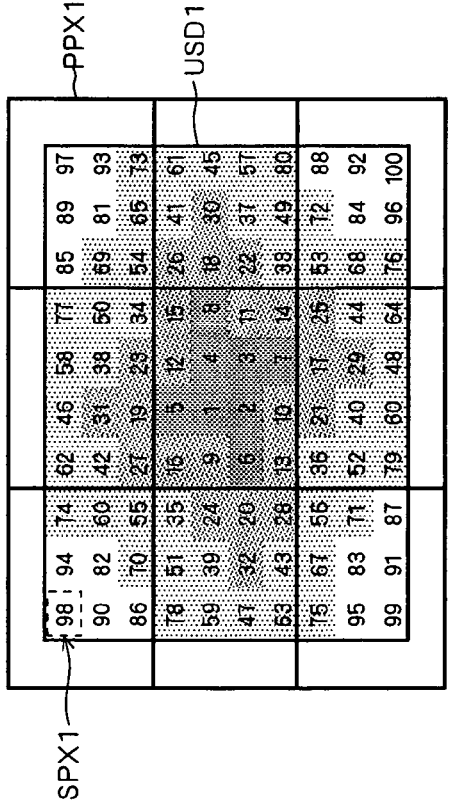
Figure 10C:
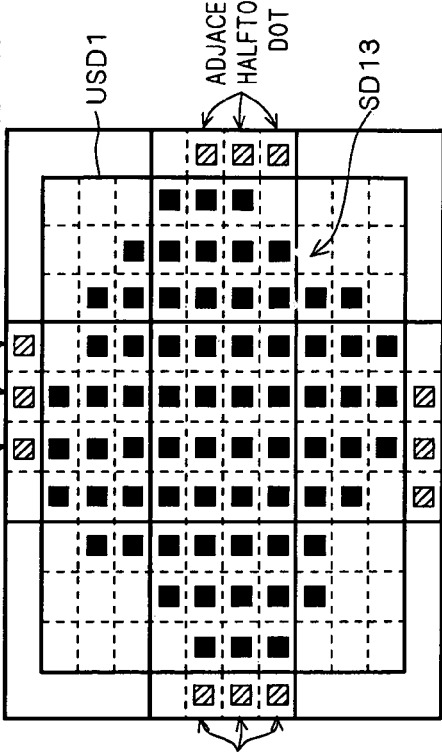
Figure 10D:
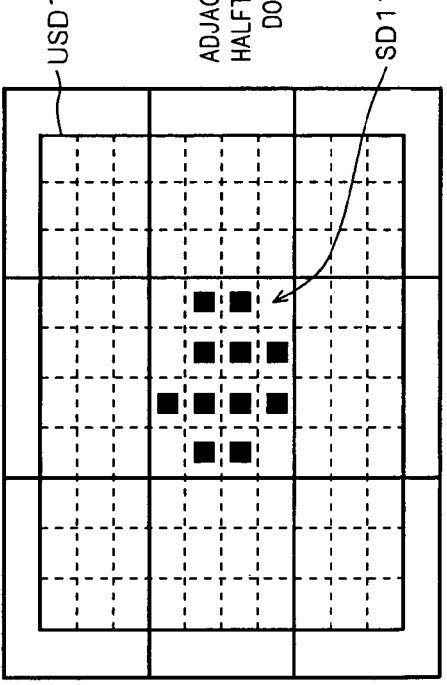

FIGS. 10B, 10C and 10D show the results of the screening process, that is, halftone dots SD11, SD12 and SD13 formed in the halftone cell USD1 when the gradation levels of the picture-originated pixels PPX1 are 12, 40 and 70, respectively. The halftone dot SD11 shown in FIG. 10B is composed of only recorder grids SPX1 having SPM values of not greater than 11 because the gradation level in the gradation area is 12. The increase in gradation level in the gradation area as shown in FIGS. 10C and 10D increases the size of the halftone dot. Referring to FIG. 10D where the gradation level in the gradation area is 70, adjacent halftone dots are in contact with each other.

As discussed above, the screening process uniquely determines the shape of the halftone dot formed in the halftone cell USD in the corresponding position, based on the gradation level given to the picture-originated pixels PPX1 and the SPM data.

The descreening process, on the other hand, is basically in inverse relation to the above-mentioned screening process. In this preferred embodiment, the halftone dot positions and the picture-originated pixel positions are precisely detected in the coordinate system represented on the order of recorder grids, and the correspondence therebetween is exactly determined at the output resolution level. Therefore, this preferred embodiment can carry out this inverse process more precisely than the background art techniques.

Figure 11:
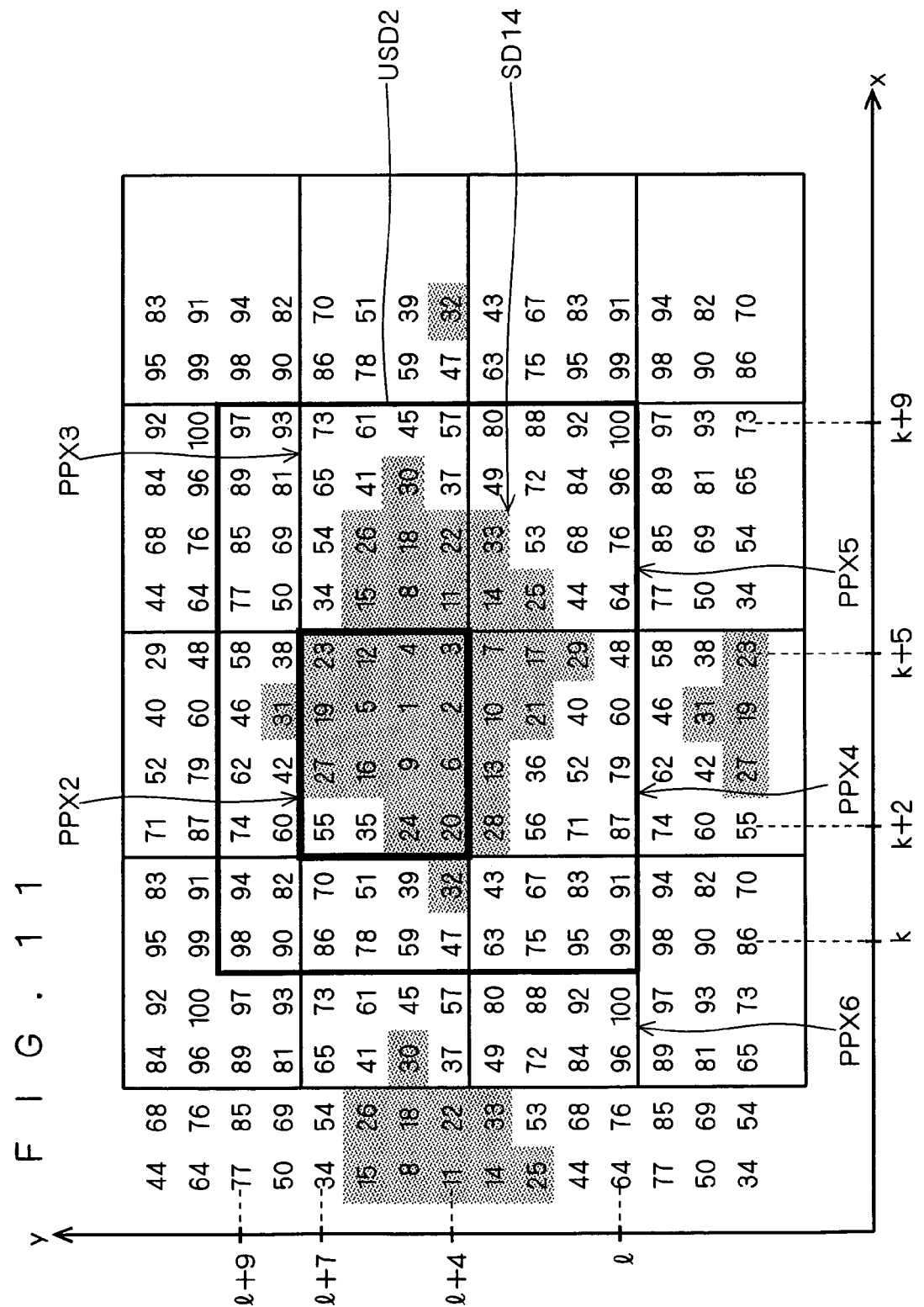
FIG. 11 illustrates the descreening process.

FIG. 11 illustrates the descreening process implemented under the action of the descreening section 41. For simplicity of discussion, it is assumed that the halftone dots present in the range shown in FIG. 11 have the same dot percentage, and there is no boundaries between the picture-originated pixels. In FIG. 11, the x-axis is defined to extend in the horizontal direction of the recorder grids, and the y-axis is defined to extend in the vertical direction thereof. It is also assumed that a halftone cell USD2 containing 10×10=100 recorder grids is positioned in the range represented by (x, y)=(k, l) to (k+9, l+9), and a picture-originated pixel PPX2 corresponding to 4×4=16 recorder grids is positioned in the range represented by (x, y)=(k+2, l+4) to (k+5, l+7). The former is determined under the action of the halftone dot position detection section 31, and the latter is determined under the action of the picture-originated pixel arrangement detection section 32.

The descreening process in this preferred embodiment is the process of judging how the recorder grids constituting a single picture-originated pixel contribute to the formation of the halftone dots, based on the SPM data, after the determination of the arrangement of the halftone dots and the picture-originated pixels, thereby to estimate the gradation level originally possessed by the single picture-originated pixel based on the result of judgment. In particular, since this preferred embodiment specifies the halftone dot positions with high accuracy, the threshold value setting section 411 can apply the SPM data to the halftone cells in a manner similar to the screening process. Additionally, since this preferred embodiment detects the arrangement of the picture-originated pixels in the original layout data with high accuracy, the gradation level setting section 412 can substantially faithfully perform the inverse process of the original screening process. A state in which a recorder grid actually forms a halftone dot is referred to hereinafter as an "ON-state" and a state in which a recorder grid does not form a halftone dot is referred to as an "OFF-state." In FIG. 11, the shaded recorder grids are in the ON-state, and other recorder grids are in the OFF-state.

The determination of the halftone dot position data D2 causes the threshold value setting section 411 to bring a halftone cell for use in formation of the halftone dot into correspondence with the SPM data for formation of the halftone dot. In other words, the recorder grids in the halftone cell and the SPM values are brought into one-to-one correspondence with each other.

The screened image in the first region is formed by reproducing the gradation levels originally possessed by the picture-originated pixels with low resolution by the use of the halftone dots each composed of a set of recorder grids with higher resolution. This allows the estimation of the gradation level represented by each halftone dot from the correspondence between the ON/OFF state of the recorder grids included in the picture-originated pixels and the SPM values given to the respective recorder grids.

Figure 12:
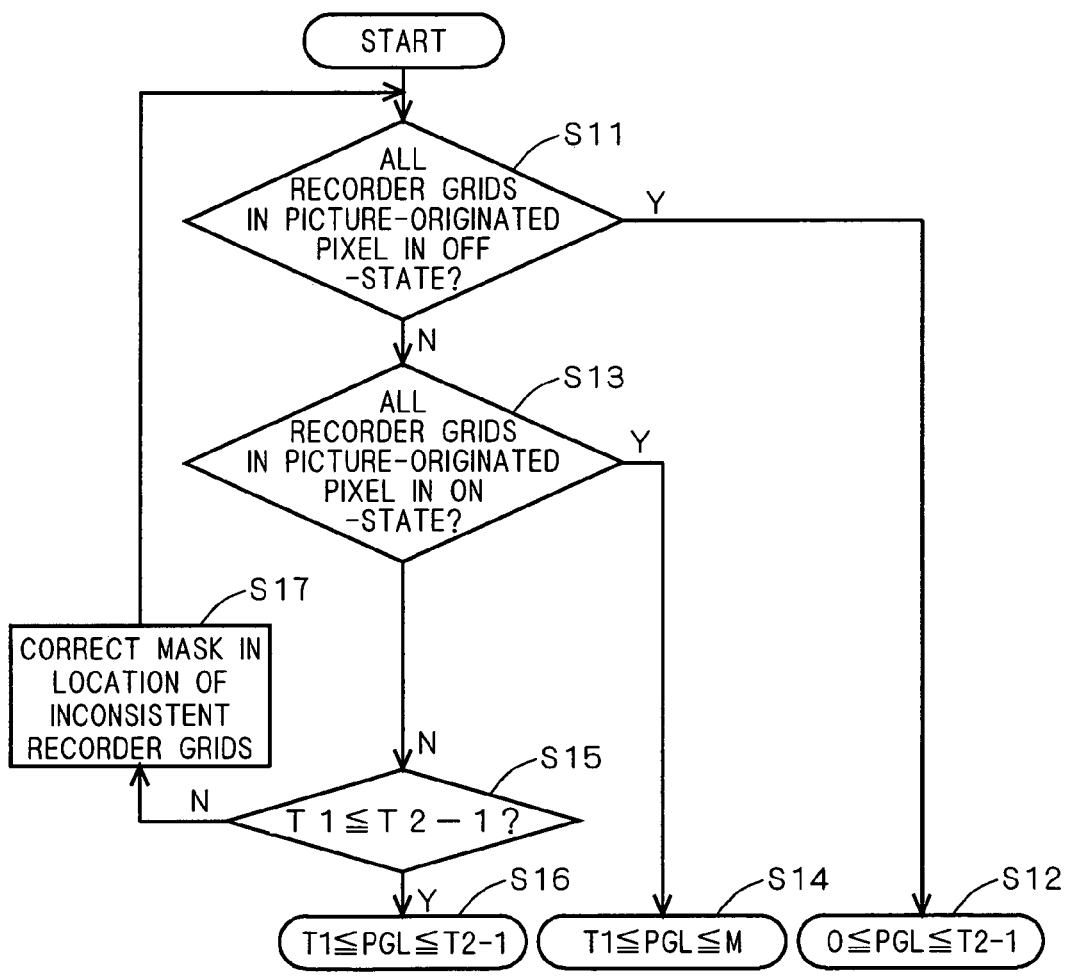
FIG. 12 is a flowchart showing the process of estimating gradation levels for picture-originated pixels.
Figure 15:
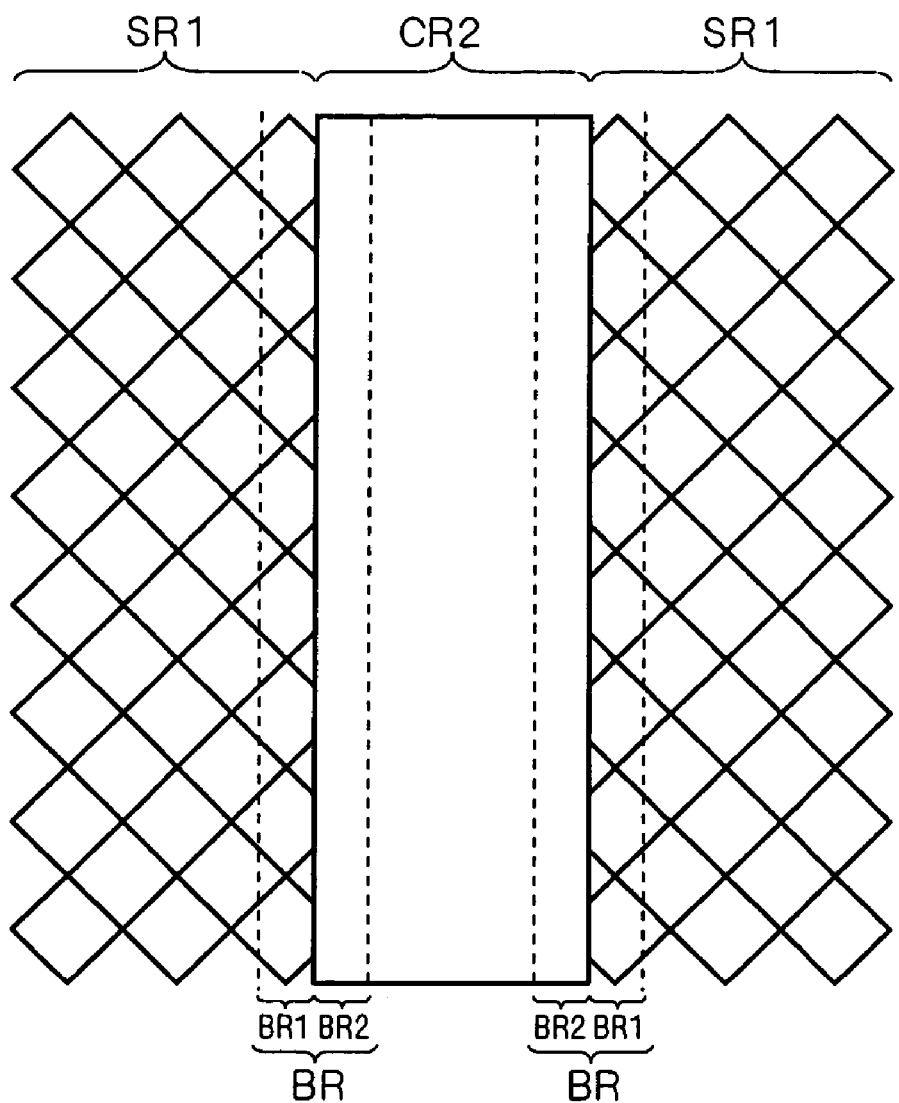
FIG. 15 is a view illustrating the background art.

FIG. 12 is a flowchart showing the process of estimating the gradation level for each picture-originated pixel, which is performed in the gradation level setting section 412. The process shown in FIG. 12 includes the process of judging whether or not the separation mask data DM requires correction. It is now assumed that the minimum and maximum possible values of the gradation level PGL of the picture-originated pixels are "0" and "M" (where M is an integer), respectively. For purposes of simplicity, M=100 in FIG. 11. In this case, therefore, the dot percentage is equal to the gradation level in the gradation area. The maximum of the SPM values of the recorder grids in the ON-state is denoted by T1 and the minimum of the SPM values of the recorder grids in the OFF-state is denoted by T2.

When all of the recorder grids in an objective picture-originated pixel are in the OFF-state (YES in Step S11), the dot percentage of a corresponding halftone dot is at least less than the minimum T2 of the SPM values associated with the recorder grids contained in the objective picture-originated pixel, and there is a possibility that the dot percentage is 0%. Thus, the gradation level PGL is estimated to be within the range indicated in Step S12. As an example, all of the recorder grids contained in a picture-originated pixel PPX6 shown in FIG. 11 are in the OFF-state, and T2=43. It is hence estimated that a halftone dot SD14 present in the halftone cell USD2 and the halftone dot present to the left thereof both corresponding to the picture-originated pixel PPX6 have a dot percentage of not greater than 42%.

In this case, all of the recorder grids in the objective picture-originated pixel may be regarded as being included in the first region. It is therefore judged that there is no need to correct the separation mask.

On the other hand, when all of the recorder grids in an objective picture-originated pixel are in the ON-state (YES in Step S13), the dot percentage of a corresponding halftone dot is at least not less than the maximum T1 of the SPM values associated with the recorder grids contained in the objective picture-originated pixel, and there is a possibility that the dot percentage is 100%. Thus, the gradation level PGL is estimated to be within the range indicated in Step S14.

In this case, all of the recorder grids in the objective picture-originated pixel may also be regarded as being included in the first region. It is therefore judged that there is no need to correct the separation mask.

When the above-mentioned conditions are not satisfied or when some of the recorder grids constituting a picture-originated pixel are in the ON-state and others in the OFF-state (NO in Step S11 and NO in Step S13), a judgment is made as to whether or not the relation indicated in Step S15 is satisfied. If the relation in Step S15 is satisfied (YES in Step S15), the gradation level always exists as a value of between T1 and (T2−1) (in Step S16). For the picture-originated pixel PPX2 shown in FIG. 11 as an example, it is estimated that the gradation level PGL takes a value of between 27 and 34 because T1=27 and T2=35. Similarly, it is estimated that the gradation levels PGL of picture-originated pixels PPX3, PPX4 and PPX5 take a value of between 30 and 33, a value of between 29 and 35 and a value of between 33 and 43, respectively. After the range of the gradation level which each picture-originated pixel can take is obtained, the gradation level is then specified based on the range. A simple method, for example, is to determine the median value in the range as the gradation level of the picture-originated pixel. In this method, the values of 30.5, 32.5, 32 and 38 are obtained for the picture-originated pixels PPX2 to PPX5, respectively. For the halftone dot SD14 shown in FIG. 11 which is a halftone dot corresponding to the gradation level PGL=33 (or a halftone dot having a dot percentage of 33%), the estimation that the median value is equal to the gradation level will provide a substantially appropriate value because an error is about 5.

The picture-originated pixels PPX2 to PPX5, which lie in the same halftone cell USD, should have the same gradation level if there is no boundary between the first regions. It is therefore estimated that a proper gradation level lies within a range common to the estimated ranges of the four picture-originated pixels PPX2 to PPX5. Since the value satisfying all of the estimated ranges of the four picture-originated pixels PPX2 to PPX5 is only 33, the estimated value of these picture-originated pixels PPX2 to PPX5 may be determined as 33. In this case, the actual value is equal to the estimated value. Thus considering the conditions of adjacent picture-originated pixels allows the more accurate estimation of the gradation level.

In this case, all of the recorder grids in the objective picture-originated pixel may also be regarded as being included in the first region. It is therefore judged that there is no need to correct the separation mask.

The method of estimating the gradation level is not limited to the above-mentioned method, but a variety of methods may be employed.

A state in which the relation in Step S15 is not satisfied (NO in Step S15), on the other hand, means that a situation actually impossible when halftone dots are formed in the first region has arisen. FIG. 13 illustrates the occurrence of such a situation. In FIG. 13, a picture-originated pixel PPX7 containing 7×7=49 recorder grids is shown as lying within a halftone cell USD3 containing 10×10=100 recorder grids. The picture-originated pixel PPX7 does not satisfy the relation in Step S15 because T1=68 and T2=24, and hence is not applied to the condition in Step S16. This means that a contradiction has arisen between a result of the assumption that binarization is performed by the screening process using the SPM values brought into correspondence by the threshold value setting section 411 and a state of binarization in the actual screened image.

Since some of the recorder grids constituting the picture-originated pixel PPX7 are in the ON-state and others in the OFF-state, the gradation level should take a value of between T1 and T2 to represent only a picture image. However, this requirement is not satisfied in the situation of FIG. 13. It is hence judged that recorder grids constituting a character or a line are mixed into the recorder grids constituting the picture-originated pixel PPX7. In other words, the first region and the second region are not precisely separated from each other by the separation mask. In this case, it is therefore judged that the process of precisely separating the first and second regions from each other, that is, the correction process of the separation mask must be carried out to properly determine the gradation level. Then, the separation mask is corrected under the action of the mask correction section 33 based on the contradiction related to the SPM values lying between the recorder grids in the ON-state and the recorder grids in the OFF-state (in Step S17).

In the situation shown in FIG. 13, recorder grids to be processed are recorder grids (referred to hereinafter as inconsistent ON-state recorder grids) in the ON-state and having an SPM value less than the minimum value T2, and recorder grids (referred to hereinafter as inconsistent OFF-state recorder grids) in the OFF-state and having an SPM value greater than the maximum value T1. Specifically, the inconsistent ON-state recorder grids include 13 recorder grids having the gradation levels of 25, 26, 27, 29, 33, 34, 36, 40, 44, 52, 53, 54 and 68, and the inconsistent OFF-state recorder grids include 10 recorder grids having the gradation levels of 24, 28, 32, 25, 39, 43, 51, 55, 56 and 67.

If the inconsistent ON-state recorder grids actually constitute a halftone dot of a picture image, the inconsistent OFF-state recorder grids lying in the same halftone cell USD3 and having a gradation level less than the maximum value T1 should essentially be in the ON-state. The fact that the inconsistent OFF-state recorder grids are nevertheless in the OFF-state means that the inconsistent ON-state recorder grids do not constitute the halftone dot of the picture image or do correspond to the recorder grids constituting a character or a line. Conversely, considering that the inconsistent OFF-state recorder grids constitute a halftone dot of a picture image only when the inconsistent ON-state recorder grids constitute the halftone dot, a location where the inconsistent ON-state and OFF-state recorder grids are in contact with each other will always be the boundary between a character/line and a picture image. In the situation shown in FIG. 13, the boundary between the first and second regions will lie between the inconsistent ON-state recorder grid having the SPM value of 27 and the inconsistent OFF-state recorder grid having the SPM value of 55 and between the inconsistent ON-state recorder grid having the SPM value of 36 and the inconsistent OFF-state recorder grid having the SPM value of 56.

For each picture-originated pixel in which the contradiction occurs, the boundary between the inconsistent recorder grids detected by the above-mentioned judgment is subjected to interpolation, e.g. linear interpolation, as appropriate. This allows the separation of the first and second regions which has not yet been detected by the use of only the separation mask. The boundary detection process based on the judgment on the inconsistent recorder grids corresponds to the separation mask correction process.

FIG. 14 shows an example of the result of presumption of the second region in the situation of FIG. 13. It is presumed that a second region CR1 (only the boundary of which is shown) overlaps the picture-originated pixel PPX7 in the situation of FIG. 13. Writing information about this overlap region into the separation mask data DM accomplishes the correction of the separation mask.

Then, the process in Step S11 and its subsequent steps is carried out again on the recorder grids lying in other than the overlap region within the picture-originated pixel PPX7, that is, with the second region separated at the recorder grid level (or the output resolution level). In the example shown in FIG. 14, it is estimated that the gradation level of the picture-originated pixel PPX7 takes a value of between 20 and 23 because T1=20 and T2=24. Thus, the descreening process is carried out after the precise separation of the second region which lies within the picture-originated pixel and which has not been separated by the separation mask generated in Step S2.

The gradation level is estimated for each picture-originated pixel lying in the first region, and this process is repeated for all of the n-th regions (in Step S7). This generates the layout data D4 about the picture image having multi-level gradation based on the result of estimation and the predetermined resolution, and the layout data D4 will be subjected to the subsequent process.

<Adjustment Process and Subsequent Processes>

After the layout data D4 is generated as discussed above, the image adjustment processor 50 performs a necessary adjustment process including changes in color and density of the picture image and the corrections of the tone curve and gray balance (in Step S8). After the necessary adjustment process, the screening process is carried out on the adjusted layout data under the action of the screening section 42 to generate the screened image data again, and the process of recombining the data about the separated second region with the data about the first region is subsequently carried out under the action of the region combination section 23 (in Step S9).

The generated new screened image data is outputted as required from the output device 4 (in Step S10).

These processes are accomplished by the use of known techniques.

The adjustment process and its subsequence processes are not essential in the present invention. For example, the layout data obtained by the descreening process may be diverted to the production of other printed materials.

<Modifications>

Figure 16:
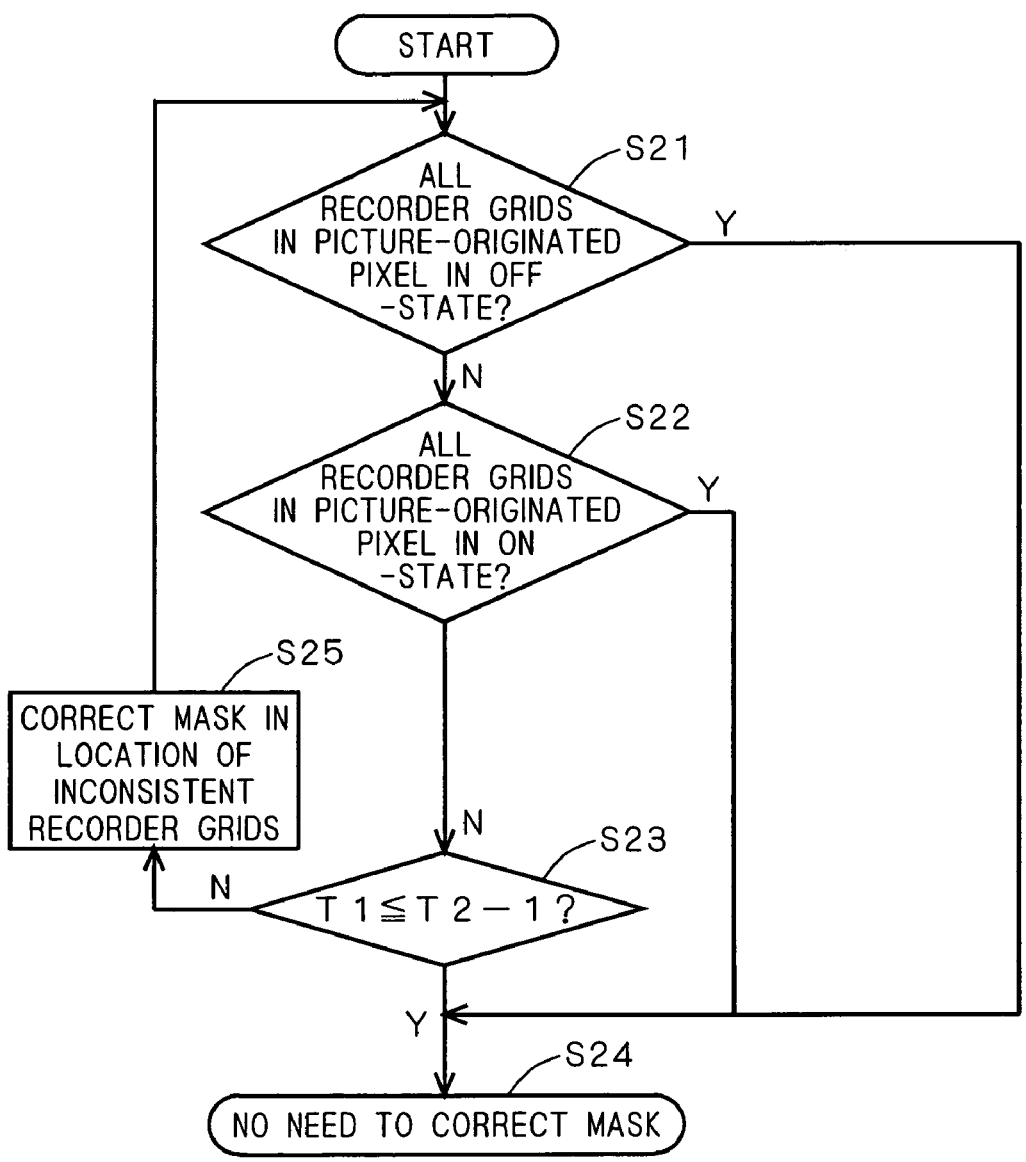
FIG. 16 is a flowchart showing the process of judging whether or not a separation mask requires correction.

If the generation of the separation mask is not aimed at the descreening process, the descreening process in Step S6 of FIG. 3 and the subsequent processes are not essential. The gradation level setting section 412 or the judging element need not estimate the gradation level as shown in FIG. 12, but is required only to judge whether or not the separation mask requires correction. Thus, the process is simplified as compared with the flowchart of FIG. 12. FIG. 16 is a flowchart showing the process of judging whether or not this correction is required.

Steps S21, S22 and S23 of FIG. 16 are identical with Steps S11, S13 and S15 of FIG. 12. If the answers to Steps S21 to S23 are YES, it is judged that the separation mask data DM need not be corrected for an objective picture-originated pixel (in Step S24). Only if the answer to Step S23 is NO, the separation mask data DM is corrected as described above based on the positional relation between the inconsistent recorder grids. Then, the corrected separation mask data DM will be subjected to the region separation process.

While the invention has been described in detail, the foregoing description is in all aspects illustrative and not restrictive. It is understood that numerous other modifications and variations can be devised without departing from the scope of the invention.

What is claimed is:

1. A method of descreening a screened image generated from an original image, comprising the steps of:
   (a) detecting the position of each halftone dot forming said screened image;
   (b) detecting from said screened image an arrangement of picture-originated pixels in a gradation area of an image from which said screened image is generated; and
   (c) generating layout data having multi-level gradation from said screened image,
   said step (c) including the steps of
   (c-1) bringing predetermined threshold values into correspondence with individual recorder grids constituting each halftone cell determined in said step (a), and
   (c-2) setting gradation levels in the gradation area for descreened layout data,
   said gradation levels in the gradation area being set based on a correspondence between said predetermined threshold values and whether or not the recorder grids present in the position of each of said picture-originated pixels contribute to halftone dot formation.

2. The method according to claim 1, further comprising the step of
   (d) separating a first region from which the gradation area is to be derived and a second region from which a monotone area is to be derived from each other by using a separation mask,
   the descreening being performed only on said first region.

3. The method according to claim 2, further comprising the step of
   (e) specifying inconsistent recorder grids forming each halftone dot and having a contradiction between a result of an assumption that binarization is performed using said threshold values brought into correspondence in said step (c-1) and an actual state of binarization, to correct said separation mask based on a positional relationship between said inconsistent recorder grids in each halftone cell.

4. The method according to claim 1, wherein
said step (b) includes the step of
   (b-1) extracting edges of halftone dots forming said screened image.

5. The method according to claim 4, wherein
count distributions of said edges in a plurality of predetermined counting directions on said screened image are obtained for said counting directions respectively by counting said edges, and peak positions in said count distributions are specified as boundary positions between said picture-originated pixels.

6. The method according to claim 1, wherein
in said step (b), said arrangement of said picture-originated pixels is detected based on the shapes of halftone dots positioned on a boundary between a plurality of regions having different dot percentages in said screened image.

7. A method of descreening a screened image generated from an original image, comprising the step of
   (a) detecting the position of each halftone dot forming said screened image,
   wherein, in said step (a), count distributions of recorder grids in a plurality of counting directions on said screened image are obtained for said counting directions respectively by counting said recorder grids, and the position of each halftone dot is detected based on the dependence of said count distributions upon said counting directions.

8. The method according to claim 7, wherein
a screen angle and a screen ruling are determined based on one of said counting directions which provides the maximum count at a peak in said count distributions and the maximum peak-to-peak spacing.

9. The method according to claim 8, wherein
the central position of each halftone dot is determined from a peak position in a count distribution for a first counting direction corresponding to said screen angle and a peak position in a count distribution for a second counting direction perpendicular to said first counting direction.

10. An image processing device for descreening a screened image generated from an original image, comprising:
   (a) a halftone dot position detection element for detecting the position of each halftone dot forming said screened image;
   (b) a picture-originated pixel arrangement detection element for detecting from said screened image an arrangement of picture-originated pixels in a gradation area of an image from which said screened image is generated; and
   (c) a descreening element for generating layout data having multi-level gradation from said screened image,
   said descreening element including
   (c-1) a threshold value setting element for bringing predetermined threshold values into correspondence with individual recorder grids constituting each halftone cell determined by said halftone dot position detection element, and
   (c-2) a gradation level setting element for setting gradation levels in the gradation area for descreened layout data, said gradation levels in the gradation area being set based on a correspondence between said predetermined threshold values and whether or not the recorder grids present in the position of each of said picture-originated pixels contribute to halftone dot formation.

11. The image processing device according to claim 10, further comprising
(d) a region separation element for separating a first region from which the gradation area is to be derived and a second region from which a monotone area is to be derived from each other by using a separation mask, the descreening being performed only on said first region.

12. The image processing device according to claim 11, further comprising
(e) a separation mask correction element for specifying inconsistent recorder grids forming each halftone dot and having a contradiction between a result of an assumption that binarization is performed using said threshold values brought into correspondence by said threshold value setting element and an actual state of binarization, to correct said separation mask based on a positional relationship between said inconsistent recorder grids in each halftone cell.

13. The image processing device according to claim 10, wherein
said picture-originated pixel arrangement detection element includes
an edge extraction element for extracting edges of halftone dots forming said screened image.

14. The image processing device according to claim 13, wherein
count distributions of said edges in a plurality of predetermined counting directions on said screened image are obtained for said counting directions respectively by counting said edges, and peak positions in said count distributions are specified as boundary positions between said picture-originated pixels.

15. The image processing device according to claim 10, wherein
said picture-originated pixel arrangement detection element detects said arrangement of said picture-originated pixels, based on the shapes of halftone dots positioned on a boundary between a plurality of regions having different dot percentages in said screened image.

16. An image processing device for descreening a screened image generated from an original image, comprising:
a descreening element for generating layout data having multi-level gradation from said screened image; and
a halftone dot position detection element for detecting the position of each halftone dot forming said screened image,
wherein said halftone dot position detection element obtains count distributions of recorder grids in a plurality of counting directions on said screened image for said counting directions respectively by counting said recorder grids, thereby to detect the position of each halftone dot, based on the dependence of said count distributions upon said counting directions.

17. The image processing device according to claim 16, wherein
a screen angle and a screen ruling are determined based on one of said counting directions which provides the maximum count at a peak in said count distributions and the maximum peak-to-peak spacing.

18. The image processing device according to claim 17, wherein
the central position of each halftone dot is determined from a peak position in a count distribution for a first counting direction corresponding to said screen angle and a peak position in a count distribution for a second counting direction perpendicular to said first counting direction.

19. A computer-readable recording medium storing a program executed in a computer to thereby cause said computer to operate as a control element for an image processing device for descreening a screened image generated from an original image, said image processing device comprising:
(a) a halftone dot position detection element for detecting the position of each halftone dot forming said screened image;
(b) a picture-originated pixel arrangement detection element for detecting from said screened image an arrangement of picture-originated pixels in a gradation area of an image from which said screened image is generated; and
(c) a descreening element for generating layout data having multi-level gradation from said screened image, said descreening element including
(c-1) a threshold value setting element for bringing predetermined threshold values into correspondence with individual recorder grids constituting each halftone cell determined by said halftone dot position detection element, and
(c-2) a gradation level setting element for setting gradation levels in the gradation area for descreened layout data, said gradation levels in the gradation area being set based on a correspondence between said predetermined threshold values and whether or not the recorder grids present in the position of each of said picture-originated pixels contribute to halftone dot formation.

20. A method of separating a first region from which a gradation area is to be derived and a second region from which a monotone area is to be derived from each other in a screened image generated from an original image, comprising the steps of:
(a) acquiring a separation mask corresponding to said screened image;
(b) detecting the position of each halftone dot forming said screened image;
(c) detecting from said screened image an arrangement of picture-originated pixels in the gradation area of an image from which said screened image is generated; and
(d) judging whether or not said separation mask requires correction, said step (d) including the steps of
(d-1) bringing predetermined threshold values into correspondence with individual recorder grids constituting each halftone cell determined in said step (b), and
(d-2) specifying inconsistent recorder grids forming each halftone dot and having a contradiction between a result of an assumption that binarization is performed using said threshold values brought into correspondence in said step (d-1) and an actual state of binarization, to judge whether or not said separation mask requires correction, based on a positional relationship between said inconsistent recorder grids in each halftone cell,
said inconsistent recorder grids being specified based on a correspondence between said predetermined threshold values and whether or not the recorder grids present in the position of each of said picture-originated pixels contribute to halftone dot formation; and (c) correcting said separation mask based on the positional relationship between said inconsistent recorder grids when it is judged in said step (d) that said separation mask requires correction.

21. An image processing device for separating a first region from which a gradation area is to be derived and a second region from which a monotone area is to be derived from each other in a screened image generated from an original image, comprising:

(a) a separation mask acquiring element for acquiring a separation mask;

(b) a halftone dot position detection element for detecting the position of each halftone dot forming said screened image;

(c) a picture-originated pixel arrangement detection element for detecting from said screened image an arrangement of picture-originated pixels in the gradation area of an image from which said screened image is generated; and (d) a judging element for judging whether or not said separation mask requires correction, said judging element including (d-1) a threshold value setting element for bringing predetermined threshold values into correspondence with individual recorder grids constituting each halftone cell determined by said halftone dot position detection element, and (d-2) a judgment processing element for specifying inconsistent recorder grids forming each halftone dot and having a contradiction between a result of an assumption that binarization is performed using said threshold values brought into correspondence by said threshold value setting element and an actual state of binarization, to judge whether or not said separation mask requires correction, based on a positional relationship between said inconsistent recorder grids in each halftone cell, said inconsistent recorder grids being specified based on a correspondence between said predetermined threshold values and whether or not the recorder grids present in the position of each of said picture-originated pixels contribute to halftone dot formation; and (e) a correction element for correcting said separation mask based on the positional relationship between said inconsistent recorder grids when it is judged by said judging element that said separation mask requires correction.

22. A computer-readable recording medium storing a program executed in a computer to thereby cause said computer to operate as a control element for an image processing device for separating a first region from which a gradation area is to be derived and a second region from which a monotone area is to be derived from each other in a screened image generated from an original image, said image processing device comprising:

(a) a separation mask acquiring element for acquiring a separation mask;

(b) a halftone dot position detection element for detecting the position of each halftone dot forming said screened image;

(c) a picture-originated pixel arrangement detection element for detecting from said screened image an arrangement of picture-originated pixels in the gradation area of an image from which said screened image is generated; and (d) a judging element for judging whether or not said separation mask requires correction, said judging element including (d-1) a threshold value setting element for bringing predetermined threshold values into correspondence with individual recorder grids constituting each halftone cell determined by said halftone dot position detection element, and (d-2) a judgment processing element for specifying inconsistent recorder grids forming each halftone dot and having a contradiction between a result of an assumption that binarization is performed using said threshold values brought into correspondence by said threshold value setting element and an actual state of binarization, to judge whether or not said separation mask requires correction, based on a positional relationship between said inconsistent recorder grids in each halftone cell, said inconsistent recorder grids being specified based on a correspondence between said predetermined threshold values and whether or not the recorder grids present in the position of each of said picture-originated pixels contribute to halftone dot formation; and (e) a correction element for correcting said separation mask based on the positional relationship between said inconsistent recorder grids when it is judged by said judging element that said separation mask requires correction.

* * * * *